United States Patent
Chai et al.

(10) Patent No.: US 11,576,068 B2
(45) Date of Patent: Feb. 7, 2023

(54) COMMUNICATION METHOD, COMMUNICATIONS APPARATUS, AND SYSTEM

(71) Applicant: HUAWEI TECHNOLOGIES CO., LTD., Guangdong (CN)

(72) Inventors: Li Chai, Shenzhen (CN); Hong Wang, Beijing (CN); Xun Tang, Beijing (CN); Jian Zhang, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 23 days.

(21) Appl. No.: 17/091,821

(22) Filed: Nov. 6, 2020

(65) Prior Publication Data

US 2021/0058812 A1 Feb. 25, 2021

Related U.S. Application Data

(63) Continuation of application No. PCT/CN2018/086400, filed on May 10, 2018.

(51) Int. Cl.
*H04W 24/10* (2009.01)
*H04W 72/12* (2009.01)
*H04W 72/14* (2009.01)

(52) U.S. Cl.
CPC ....... *H04W 24/10* (2013.01); *H04W 72/1284* (2013.01); *H04W 72/14* (2013.01)

(58) Field of Classification Search
None
See application file for complete search history.

(56) References Cited

U.S. PATENT DOCUMENTS

2009/0196275 A1* 8/2009 Damnjanovic ....... H04W 28/06
370/345
2013/0242726 A1 9/2013 Zhu et al.
(Continued)

FOREIGN PATENT DOCUMENTS

CN 101534222 A 9/2009
CN 103748937 A 4/2014
(Continued)

OTHER PUBLICATIONS

3GPP TR 38.913 V14.3.0 (Jun. 2017), "3rd Generation Partnership Project; Technical Specification Group Radio Access Network; Study on Scenarios and Requirements for Next Generation Access Technologies; (Release 14)," Jun. 2017, 39 pages.
(Continued)

*Primary Examiner* — Scott M Sciacca
(74) *Attorney, Agent, or Firm* — Fish & Richardson P.C.

(57) ABSTRACT

Methods, systems, and apparatus for communications are provided. In one aspect, a communication method including: determining, by a first communications apparatus, buffer latency information, and sending, by the first communications apparatus, the buffer latency information. The buffer latency information is determined based on a buffer latency of one or more data packets. The buffer latency indicates one of a time interval between a time point at which a data packet arrives at an access stratum (AS) and a time point at which a corresponding buffer status report (BSR) is sent, or a time interval between a time point at which a data packet arrives at an AS and a time point at which a corresponding uplink grant is received.

22 Claims, 10 Drawing Sheets

(56) References Cited

U.S. PATENT DOCUMENTS

| | | | |
|---|---|---|---|
| 2016/0285775 A1 | 9/2016 | Damnjanovic et al. | |
| 2017/0034025 A1* | 2/2017 | Kollar | H04W 28/0268 |
| 2018/0084451 A1* | 3/2018 | Fukuta | H04W 4/70 |

FOREIGN PATENT DOCUMENTS

| | | |
|---|---|---|
| CN | 104918232 A | 9/2015 |
| CN | 106162728 A | 11/2016 |
| CN | 106717055 A | 5/2017 |
| CN | 107277856 A | 10/2017 |
| EP | 2356872 B1 | 12/2014 |
| WO | 2016061976 A1 | 4/2016 |

OTHER PUBLICATIONS

3GPP TS 36.331 V15.1.0 (Mar. 2018), "3rd Generation Partnership Project;Technical Specification Group Radio Access Network; Evolved Universal Terrestrial Radio Access (E-UTRA); Radio Resource Control (RRC);Protocol specification (Release 15)," Mar. 2018, 786 pages.

3GPP TS 36.321 V15.1.0 (Mar. 2018), "3rd Generation Partnership Project; Technical Specification Group Radio Access Network; Evolved Universal Terrestrial Radio Access (E-UTRA); Medium Access Control (MAC) protocol specification (Release 15)," Mar. 2018, 109 pages.

3GPP TS 36.213 V15.1.0 (Mar. 2018), 3rd Generation Partnership Project; Technical Specification Group Radio Access Network; Evolved Universal Terrestrial Radio Access (E-UTRA); Physical layer procedures(Release 15), Mar. 2018, 501 pages.

PCT International Search Report and Written Opinion issued International Application No. PCT/CN2018/086400 dated Feb. 3, 2019,17 pages (with English translation).

Qualcomm Incorporated, "Consideration on UL delay measurement," 3GPP TSG-RAN WG2 Meeting #90, R2-152490, Fukuoka, Japan, May 25-29, 2015, 2 pages.

Nokia Networks, "UL delay measurement," 3GPP TSG-RAN WG2 Meeting #91, R2-153145, Beijing, China, Aug. 24-28, 2015, 3 pages.

Extended European Search Report in European Application No. 18918125.8, dated Mar. 19, 2021, 10 pages.

Office Action issued in Chinese Application No. 201880093323.6 dated Sep. 1, 2021, 9 pages (with English translation).

Office Action issued in Chinese Application No. 201880093323.6 dated Mar. 2, 2022, 9 pages.

Office Action issued in Chinese Application No. 201880093323.6 dated Jul. 14, 2022, 4 pages.

OPPO, "CA Duplication impacton BSR trigger," 3GPP TSG-RAN2 #101bis, R2-1804430, Sanya, China, Apr. 16-20, 2018, 5 pages.

Samsung, "Packet delay measurement for Rel-13 MDT enhancements," 3GPP TSG RAN WG2 #90, R2-152725, Fukuoka, Japan, May 25-29, 2015, 3 pages.

* cited by examiner

COMMUNICATION METHOD, COMMUNICATIONS APPARATUS, AND SYSTEM

CROSS-REFERENCE TO RELATED APPLICATIONS

This application is a continuation of International Application No. PCT/CN2018/086400, filed on May 10, 2018, the disclosure of which is hereby incorporated by reference in its entirety.

TECHNICAL FIELD

This application relates to the communications field, and more specifically, to a communication method, a communications apparatus, and a system.

BACKGROUND

An end to end latency is an important parameter used to indicate a service transmission latency. The end to end latency may be a latency from user equipment (User Equipment, UE) to an application server, or may be a latency from user equipment to user equipment.

Currently, in some communications systems, user experience is expected to be improved by reducing the end to end latency. For example, in a new radio access technology (new radio access technology, NR) of a 5th generation (5th generation, 5G) communications system, the end to end latency is expected to be controlled within 1 millisecond (ms). In particular, some services that have a relatively high requirement on the latency, such as ultra-reliable low-latency communications (ultra-reliable and low latency communication, URLLC), propose a higher requirement on the end to end latency.

Therefore, an access network device intends to learn of the end to end latency more accurately, so as to properly schedule a resource for user equipment and increase a latency gain.

SUMMARY

This application provides a communication method, a communications apparatus, and a system, to help an access network device accurately obtain a time period of a data packet waiting in a buffer, so that the access network device more accurately learns of an end to end latency.

According to a first aspect, a communication method is provided. The method includes:

A first communications apparatus determines buffer latency information, where the buffer latency information is determined based on a buffer latency of one or more data packets, and the buffer latency indicates a time interval between a time point at which a data packet arrives at an access stratum AS and a time point at which a corresponding buffer status report (buffer status report, BSR) is sent, or the buffer latency indicates a time interval between a time point at which a data packet arrives at an AS and a time point at which a corresponding uplink grant (uplink grant, UL grant) is received; and the first communications apparatus sends the buffer latency information.

Correspondingly, a second communications apparatus receives the buffer latency information.

In the foregoing communication method, the first communications apparatus may be a terminal device or a chip disposed in a terminal device, and the second communications apparatus may be an access network device or a chip disposed in an access network device.

Based on the foregoing technical solution, the buffer latency of the data packet is defined, to quantize a waiting time period between the time point at which the data packet arrives at the AS and the time point at which a resource scheduling request is sent, or quantize a waiting time period between the time point at which the data packet arrives at the AS and the time point at which the uplink grant is received, so that the terminal device reports the buffer latency to the access network device. The terminal device reports, to the access network device, the buffer latency information determined based on the buffer latency of the one or more data packets, so that the access network device can more accurately learn of an end to end latency. This helps the access network device make a proper resource scheduling policy, to reduce a buffer latency, so as to reduce the end to end latency, increase a latency gain, and improve user experience.

In addition, a time point at which the data packet arrives at each protocol layer (for example, a service data adaptation protocol (Service Data Adaptation Protocol, SDAP) layer, a packet data convergence protocol (Packet Data Convergence Protocol, PDCP) layer, a radio link control (Radio Link Control, RLC) layer, or a media access control (Media Access Control, MAC) layer) in the AS may be used as a start time point for calculating the buffer latency, to determine the buffer latency information. Therefore, the terminal device may obtain, based on a requirement, buffer latencies of different types of data packets (namely, an SDAP layer data packet, a PDCP layer data packet, an RLC layer data packet, and a MAC layer data packet) corresponding to the protocol layers listed above, so that the terminal device can flexibly report the buffer latency, and the access network device can more comprehensively learn of the end to end latency.

With reference to the first aspect, in some implementations of the first aspect, the buffer latency information is used to indicate:

a buffer latency of each of the one or more data packets; or an average value, a maximum value, a minimum value, or an accumulated value of buffer latencies of a plurality of data packets.

To be specific, the terminal device may directly report the buffer latency of the data packet. Alternatively, the terminal device may process the buffer latencies of the plurality of data packets and then perform reporting, and this can reduce bit overheads used by the terminal device for reporting, and can reduce processing load of the access network device.

With reference to the first aspect, in some implementations of the first aspect, that a first communications apparatus determines buffer latency information includes:

The first communications apparatus determines the buffer latency information based on a data packet type.

As an example instead of a limitation, the data packet type may include: an SDAP service data unit (service data unit, SDU), an SDAP protocol data unit (protocol data unit, PDU), a PDCP PDU, an RLC PDU, a MAC PDU, or the like.

The terminal device may determine buffer latencies based on different data packet types and a requirement. This is very flexible.

The data packet type may be indicated by the access network device, that is, may be semi-statically or dynamically configured; or may be predefined, for example, defined in a protocol, that is, statically configured. This is not limited in this application.

Optionally, the method further includes:

The first communications apparatus receives indication information used to indicate the data packet type.

Correspondingly, the second communications apparatus sends the indication information used to indicate the data packet type.

With reference to the first aspect, in some implementations of the first aspect, that a first communications apparatus determines buffer latency information includes:

The first communications apparatus determines the buffer latency information based on a reporting granularity, where the reporting granularity includes a data packet, a logical channel, a logical channel group, a network slice, or a radio bearer.

The buffer latency information determined by the terminal device based on the reporting granularity may be buffer latency information of one or more data packets corresponding to the reporting granularity. The terminal device may report the buffer latency information based on different reporting granularities and a requirement.

Optionally, the method further includes:

The first communications apparatus sends an identifier corresponding to the reporting granularity.

Correspondingly, the second communications apparatus receives the identifier corresponding to the reporting granularity.

The buffer latency information may be determined based on the reporting granularity, to be specific, determined based on a buffer latency of one or more data packets corresponding to the reporting granularity. In this embodiment of this application, the one or more data packets corresponding to the reporting granularity may be referred to as a measurement object, and an identifier corresponding to the reporting granularity of the buffer latency information is an identifier of the measurement object.

The identifier corresponding to the buffer latency information is sent to help the access network device preferentially schedule, based on the buffer latency information, a resource for a logical channel, a logical channel group, a network slice, or a radio bearer with a relatively large latency value. In addition, the access network device may properly schedule, based on reported buffer latency information of a data packet, a resource for another data packet whose sequence number is consecutive to a sequence number of the data packet, so that buffer latency values of a plurality of data packets whose sequence numbers are consecutive are controlled to be close to a latency value. This helps reduce a jitter and improve user experience.

The reporting granularity may be indicated by the access network device, that is, may be semi-statically or dynamically configured; or may be predefined, for example, defined in a protocol, that is, statically configured. This is not limited in this application.

If the reporting granularity is indicated by the access network device, optionally, the method further includes:

The first communications apparatus receives indication information used to indicate the reporting granularity.

Correspondingly, the second communications apparatus sends the indication information used to indicate the reporting granularity.

With reference to the first aspect, in some implementations of the first aspect, that the first communications apparatus sends the buffer latency information includes:

The first communications apparatus sends the buffer latency information when a reporting condition is met.

The buffer latency information is sent based on the reporting condition, so that the terminal device may report the buffer latency information to the access network device when the buffer latency information meets the reporting condition. Therefore, the terminal device does not need to determine and report the buffer latency information in real time, so that air interface overheads and processing load of the terminal device can be reduced. The access network device also does not need to perform statistics collection and processing in real time based on the buffer latency information reported by the terminal device, so that processing load of the access network device can also be reduced.

The reporting condition may be indicated by the access network device, for example, semi-statically configured or dynamically configured; or may be predefined, for example, defined in a protocol, that is, statically configured. This is not limited in this application.

If the reporting condition is indicated by the access network device, optionally, the method further includes:

The first communications apparatus receives indication information used to indicate the reporting condition.

Correspondingly, the second communications apparatus sends the indication information used to indicate the reporting condition.

With reference to the first aspect, in some implementations of the first aspect, that the first communications apparatus sends the buffer latency information includes:

The first communications apparatus sends the buffer latency information based on a reporting periodicity.

Compared with real-time reporting, sending the buffer latency information based on the reporting periodicity can reduce overheads and processing load of the terminal device, and can also reduce processing load of the access network device because the access network device does not need to perform statistics collection and processing in real time on the buffer latency information reported by the terminal device.

The reporting periodicity may be indicated by the access network device, for example, semi-statically configured or dynamically configured; or may be predefined, for example, defined in a protocol, that is, statically configured. This is not limited in this application.

If the reporting periodicity is indicated by the access network device, optionally, the method further includes:

The first communications apparatus receives indication information used to indicate the reporting periodicity.

Correspondingly, the second communications apparatus sends the indication information used to indicate the reporting periodicity.

It should be understood that the reporting condition and the reporting periodicity may be used separately, or may be used in combination. This is not limited in this application.

With reference to the first aspect, in some implementations of the first aspect, the method further includes:

The first communications apparatus sends first reporting capability information, where the first reporting capability information is used to indicate that the first communications apparatus has a capability of reporting the buffer latency information.

Correspondingly, the second communications apparatus receives the first reporting capability information.

The access network device may determine, based on the first reporting capability information sent by the terminal device, whether to send, to the terminal device, the foregoing listed first indication information of the reporting granularity, first indication information of the data packet type, first indication information of the reporting condition, or first indication information of the reporting periodicity. The access network device may send the foregoing listed indication information when the terminal device has the capability of reporting the buffer latency information, and may not send the foregoing listed indication information when the terminal device does not have the capability of reporting the buffer latency information, to avoid unnecessary signaling overheads.

With reference to the first aspect, in some implementations of the first aspect, the method further includes:

The first communications apparatus receives first statistics collection capability information, where the first statistics collection capability information is used to indicate that the second communications apparatus has a capability of collecting statistics about the buffer latency information.

Correspondingly, the second communications apparatus sends the first statistics collection capability information.

The terminal device may determine, based on the first statistics collection capability information sent by the access network device, whether to report the buffer latency information to the access network device. The terminal device may report the buffer latency information when the access network device has the capability of collecting statistics about the buffer latency information, and may not report the buffer latency information when the access network device does not have the capability of collecting statistics about the buffer latency information, to avoid unnecessary signaling overheads.

With reference to the first aspect, in some implementations of the first aspect, the buffer latency information is carried in a MAC control element (control element, CE).

That the first communications apparatus sends the buffer latency information includes:

The first communications apparatus sends the MAC CE, where the MAC CE carries the buffer latency information.

Correspondingly, that a second communications apparatus receives the buffer latency information includes:

The second communications apparatus receives the MAC CE, where the MAC CE carries the buffer latency information.

Optionally, the identifier corresponding to the reporting granularity may be carried in the MAC CE.

The following provides two possible designs of the MAC CE, to report the foregoing buffer latency information to the access network device.

In a possible design, the MAC CE includes a first field and a second field corresponding to the first field; and the first field indicates an identifier of a logical channel, and the second field indicates buffer latency information of one or more data packets carried on the logical channel;

the first field indicates an identifier of a logical channel group, and the second field indicates buffer latency information of one or more data packets carried on one or more logical channels in the logical channel group;

the first field indicates an identifier of a network slice, and the second field indicates buffer latency information of one or more data packets transmitted on the network slice; or the first field indicates an identifier of a radio bearer, and the second field indicates buffer latency information of one or more data packets carried on the radio bearer.

This design may be considered as a newly added MAC CE, which may be independently sent from other MAC CEs. In this design, the first field may be used to indicate the identifier of the measurement object, for example, the data packet, the logical channel, the logical channel group, the network slice, or the radio bearer, and the second field may be used to indicate the buffer latency information of the measurement object.

In another possible design, the MAC CE includes a first field, a second field corresponding to the first field, and a third field corresponding to the first field; and the first field indicates an identifier of a logical channel, the second field indicates buffer latency information of one or more data packets carried on the logical channel, and the third field indicates a size of the data packets carried on the logical channel;

the first field indicates an identifier of a logical channel group, the second field indicates buffer latency information of one or more data packets carried on one or more logical channels in the logical channel group, and the third field indicates a size of the data packets carried on the logical channels in the logical channel group;

the first field indicates an identifier of a network slice, the second field indicates buffer latency information of one or more data packets transmitted on the network slice, and the third field indicates a size of the data packets transmitted on the network slice; or the first field indicates an identifier of a radio bearer, the second field indicates buffer latency information of one or more data packets carried on the radio bearer, and the third field indicates a size of the data packets carried on the radio bearer This design may be considered as an extension to an existing BSR MAC CE. In this design, the first field and the third field may still use those in the existing BSR MAC CE, and the second field may be used to indicate the buffer latency information of the measurement object indicated by the first field.

With reference to the first aspect, in some implementations of the first aspect, the buffer latency information is carried in a radio resource control (radio resource control, RRC) message.

That the first communications apparatus sends the buffer latency information includes:

The first communications apparatus sends the RRC message, where the RRC message carries the buffer latency information.

Correspondingly, that a second communications apparatus receives the buffer latency information includes:

The second communications apparatus receives the RRC message, where the RRC message carries the buffer latency information.

Optionally, the identifier corresponding to the reporting granularity of the buffer latency information is carried in the RRC message.

After the MAC layer determines the buffer latency information, the first communications apparatus may notify the RRC layer of the jitter level by using an inter-layer primitive, and the RRC layer generates the MAC CE carrying the buffer latency information. The first RRC message may be a newly added RRC message, or may be an extension to an existing RRC message. This is not limited in this application.

According to a second aspect, a communication method is provided. The method includes:

A first communications apparatus determines a jitter level based on buffer latencies of a plurality of data packets, where the buffer latency indicates a time interval between a time point at which a data packet arrives at an access stratum AS and a time point at which a corresponding buffer status report BSR is sent, or the buffer latency indicates a time interval between a time point at which a data packet arrives at an AS and a time point at which a corresponding uplink grant is received.

The first communications apparatus sends information about the jitter level.

Correspondingly, a second communications apparatus receives the information about the jitter level.

Based on the foregoing technical solution, a terminal device may determine a jitter level based on buffer latencies of a plurality of data packets, and report information about the jitter level to an access network device, so that the access network device can control buffer latencies of a plurality of adjacent data packets, to reduce the latencies to a same level. This helps reduce a jitter and improve user experience.

With reference to the second aspect, in some implementations of the second aspect, that a first communications apparatus determines a jitter level based on buffer latencies of a plurality of data packets includes:

The first communications apparatus determines the jitter level based on a data packet type and buffer latencies of a plurality of data packets corresponding to the data packet type.

As an example instead of a limitation, the data packet type may include: an SDAP SDU, an SDAP PDU, a PDCP PDU, an RLC PDU, a MAC PDU, or the like.

The terminal device may determine buffer latencies based on different data packet types and a requirement. This is very flexible.

The data packet type may be indicated by the access network device, that is, may be semi-statically or dynamically configured; or may be predefined, for example, defined in a protocol, that is, statically configured. This is not limited in this application.

Optionally, the method further includes:

The first communications apparatus receives indication information used to indicate the data packet type.

Correspondingly, the second communications apparatus sends the indication information used to indicate the data packet type.

With reference to the second aspect, in some implementations of the second aspect, that a first communications apparatus determines a jitter level includes:

The first communications apparatus determines the jitter level based on a reporting granularity and buffer latencies of a plurality of data packets corresponding to the reporting granularity.

In other words, the jitter level is determined based on the buffer latencies of the plurality of data packets corresponding to the reporting granularity in a predetermined time period.

The reporting granularity includes a logical channel, a logical channel group, a network slice, or a radio bearer.

The jitter level determined by the terminal device based on the reporting granularity may be the jitter level determined based on the buffer latencies of the plurality of data packets corresponding to the reporting granularity. The terminal device may report the information about the jitter level based on different reporting granularities and a requirement.

The reporting granularity and the predetermined time period may be indicated by the access network device to the terminal device, for example, semi-statically configured or dynamically configured; or may be predefined, for example, defined in a protocol. This is not limited in this application.

If the reporting granularity is indicated by the access network device to the terminal device, optionally, the method further includes:

The second communications apparatus receives indication information used to indicate the reporting granularity.

Correspondingly, the first communications apparatus sends the indication information used to indicate the reporting granularity.

If the predetermined time period is indicated by the access network device to the terminal device, optionally, the method further includes:

The second communications apparatus receives indication information used to indicate the predetermined time period. Correspondingly, the first communications apparatus sends the indication information used to indicate the predetermined time period.

Further optionally, the method further includes:

The first communications apparatus sends an identifier corresponding to the reporting granularity.

Correspondingly, the second communications apparatus receives the identifier corresponding to the reporting granularity.

The identifier corresponding to the information about the jitter level is sent to help the access network device pertinently and properly schedule, based on the jitter level, resources for data packets on a logical channel, a logical channel group, a network slice, or a radio bearer that have a relatively large latency difference, so that buffer latency values of a plurality of subsequently transmitted data packets are controlled to be close to a latency value. This helps reduce a jitter and improve user experience.

With reference to the second aspect, in some implementations of the second aspect, that the first communications apparatus sends information about the jitter level includes:

The first communications apparatus sends the information about the jitter level when a reporting condition is met.

The information about the jitter level is sent based on the reporting condition, so that the terminal device may report the information about the jitter level to the access network device when the information about the jitter level meets the reporting condition. Therefore, the terminal device does not need to determine and report the information about the jitter level in real time, so that air interface overheads and processing load of the terminal device can be reduced. The access network device also does not need to perform statistics collection and processing in real time based on the information about the jitter level reported by the terminal device, so that processing load of the access network device can also be reduced.

The reporting condition may be indicated by the access network device, for example, semi-statically configured or dynamically configured; or may be predefined, for example, defined in a protocol, that is, statically configured. This is not limited in this application.

If the reporting condition is indicated by the access network device, optionally, the method further includes:

The first communications apparatus receives indication information used to indicate the reporting condition.

Correspondingly, the second communications apparatus sends the indication information used to indicate the reporting condition.

With reference to the second aspect, in some implementations of the second aspect, that the first communications apparatus sends information about the jitter level includes:

The first communications apparatus sends the information about the jitter level based on a reporting periodicity.

Compared with real-time reporting, sending the information about the jitter level based on the reporting periodicity can reduce overheads and processing load of the terminal device; and can also reduce processing load of the access network device because the access network device does not need to perform statistics collection and processing in real time on the information about the jitter level reported by the terminal device.

The reporting periodicity may be indicated by the access network device, for example, semi-statically configured or dynamically configured; or may be predefined, for example, defined in a protocol, that is, statically configured. This is not limited in this application.

If the reporting periodicity is indicated by the access network device, optionally, the method further includes:

The first communications apparatus receives indication information used to indicate the reporting periodicity.

Correspondingly, the second communications apparatus sends the indication information used to indicate the reporting periodicity.

It should be understood that the reporting condition and the reporting periodicity may be used separately, or may be used in combination. This is not limited in this application.

With reference to the second aspect, in some implementations of the second aspect, the method further includes:

The first communications apparatus sends second reporting capability information, where the second reporting capability information indicates that the first communications apparatus has a capability of reporting the jitter level.

Correspondingly, the second communications apparatus receives the second reporting capability information.

The access network device may determine, based on the second reporting capability information sent by the terminal device, whether to send, to the terminal device, the foregoing listed first indication information of the reporting granularity, indication information of the predetermined time period, first indication information of the data packet type, first indication information of the reporting condition, or first indication information of the reporting periodicity. The access network device may send the foregoing listed indication information when the terminal device has the capability of reporting the information about the jitter level, and may not send the foregoing listed indication information when the terminal device does not have the capability of reporting the information about the jitter level, to avoid unnecessary signaling overheads.

With reference to the first aspect, in some implementations of the first aspect, the method further includes:

The first communications apparatus receives second statistics collection capability information, where the second statistics collection capability information is used to indicate that the second communications apparatus has a capability of collecting statistics about the jitter level.

Correspondingly, the second communications apparatus sends the second statistics collection capability information.

The terminal device may determine, based on the second statistics collection capability information sent by the access network device, whether to report the information about the jitter level to the access network device. The terminal device may report the information about the jitter level when the access network device has the capability of collecting statistics about the jitter level, and may not report the information about the jitter level when the access network device does not have the capability of collecting statistics about the jitter level, to avoid unnecessary signaling overheads.

With reference to the second aspect, in some implementations of the second aspect, the information about the jitter level is carried in a MAC CE.

That the first communications apparatus sends information about the jitter level includes:

The first communications apparatus sends the MAC CE, where the MAC CE carries the information about the jitter level.

Correspondingly, that the second communications apparatus receives the information about the jitter level includes:

The second communications apparatus receives the MAC CE, where the MAC CE carries the information about the jitter level.

Optionally, the identifier corresponding to the reporting granularity may be carried in the MAC CE.

It should be understood that the MAC CE may be a newly added MAC CE, or may be an extension to an existing MAC CE. This is not limited in this application.

In a possible design, the MAC CE includes a fourth field and a fifth field corresponding to the fourth field; and the fourth field indicates an identifier of a logical channel, and the fifth field indicates a jitter level determined based on buffer latencies of a plurality of data packets carried on the logical channel;

the fourth field indicates an identifier of a logical channel group, and the fifth field indicates a jitter level determined based on buffer latencies of a plurality of data packets carried on the logical channel group;

the fourth field indicates an identifier of a network slice, and the fifth field indicates a jitter level determined based on buffer latencies of a plurality of data packets carried on the network slice; or the fourth field indicates an identifier of a radio bearer, and the fifth field indicates a jitter level determined based on buffer latencies of a plurality of data packets carried on the radio bearer.

With reference to the second aspect, in some implementations of the second aspect, the information about the jitter level is carried in an RRC message.

That the first communications apparatus sends information about the jitter level includes:

The first communications apparatus sends the RRC message, where the RRC message carries the information about the jitter level.

Correspondingly, that the second communications apparatus receives the information about the jitter level includes:

The second communications apparatus receives the RRC message, where the second RRC message carries the information about the jitter level.

Optionally, the identifier corresponding to the reporting granularity is carried in the RRC message.

After a MAC layer determines the jitter level, the first communications apparatus may notify an RRC layer of the jitter level by using an inter-layer primitive, and the RRC layer generates the RRC message carrying the information about the jitter level. The RRC message may be a newly added RRC message, or may be an extension to an existing RRC message. This is not limited in this application.

It should be understood that the buffer latency information in the first aspect and the information about the jitter level in the second aspect may be carried in a same MAC CE, may be carried in different MAC CEs, may be carried in a same RRC message, may be carried in different RRC messages, or may be carried in signaling of different protocol layers. For example, the buffer latency information is carried in a MAC CE, and the information about the jitter level is carried in an RRC message. This is not limited in this application.

According to a third aspect, a terminal device is provided. The terminal device has a function of implementing the first communications apparatus in the method design of the first aspect or the second aspect. The function may be implemented by hardware, or may be implemented by hardware executing corresponding software. The hardware or the software includes one or more units corresponding to the foregoing function.

According to a fourth aspect, an access network device is provided. The access network device has a function of implementing the second communications apparatus in the method design of the first aspect or the second aspect. The function may be implemented by hardware, or may be implemented by hardware executing corresponding software. The hardware or the software includes one or more units corresponding to the foregoing function.

According to a fifth aspect, a terminal device is provided. The terminal device includes a transceiver and a processor. Optionally, the terminal device further includes a memory. The processor is configured to control the transceiver to send and receive a signal. The memory is configured to store a computer program. The processor is configured to: invoke the computer program from the memory, and run the computer program, to enable the terminal device to perform the method performed by the first communications apparatus in the method design of the first aspect or the second aspect.

According to a sixth aspect, an access network device is provided. The access network device includes a transceiver and a processor. Optionally, the access network device further includes a memory. The processor is configured to control the transceiver to send and receive a signal. The memory is configured to store a computer program. The processor is configured to: invoke the computer program from the memory, and run the computer program, to enable the access network device to perform the method performed by the second communications apparatus in the method design of the first aspect or the second aspect.

According to a seventh aspect, a communications system is provided. The system includes the terminal device in the third aspect and the access network device in the fourth aspect. Alternatively, the system includes the terminal device in the fifth aspect and the access network device in the sixth aspect.

According to an eighth aspect, a communications apparatus is provided. The communications apparatus may be a terminal device, or a chip disposed in a terminal device. The communications apparatus includes a processor and an interface component. The processor is coupled to a memory, and may be configured to execute an instruction in the memory through the interface component, to implement the method performed by the first communications apparatus in the method design of the first aspect or the second aspect. Optionally, the communications apparatus further includes the memory.

When the communications apparatus is a terminal device, the interface component may be a transceiver or an input/output interface.

When the communications apparatus is a chip disposed in a terminal device, the interface component may be an input/output interface.

Optionally, the transceiver may be a transceiver circuit. Optionally, the input/output interface may be an input/output circuit.

According to a ninth aspect, a communications apparatus is provided. The communications apparatus may be an access network device, or a chip disposed in an access network device. The communications apparatus includes a processor and an interface component. The processor is coupled to a memory, and may be configured to read and execute an instruction in the memory through the interface component, to implement the method performed by the second communications apparatus in the method design of the first aspect or the second aspect. Optionally, the communications apparatus further includes the memory.

When the communications apparatus is an access network device, the interface component may be a transceiver or an input/output interface.

When the communications apparatus is a chip disposed in an access network device, the interface component may be an input/output interface.

Optionally, the transceiver may be a transceiver circuit. Optionally, the input/output interface may be an input/output circuit.

According to a tenth aspect, a computer-readable medium is provided. The computer-readable medium includes an instruction. When the instruction is run on a communications apparatus, the communications apparatus is enabled to perform the method in any one of the first aspect or the possible implementations of the first aspect, or the method in any one of the second aspect or the possible implementations of the second aspect.

According to an eleventh aspect, a computer program product is provided. The computer program product includes an instruction. When the instruction is run on a communications apparatus, the communications apparatus is enabled to perform the method in any one of the first aspect or the possible implementations of the first aspect, or the method in any one of the second aspect or the possible implementations of the second aspect.

DESCRIPTION OF EMBODIMENTS

The following describes the technical solutions in this application with reference to the accompanying drawings.

The technical solutions in the embodiments of this application may be applied to various communications systems, for example, but not limited to a narrowband internet of things (Narrow Band-Internet of Things, NB-IoT) system, a global system for mobile communications (Global System of Mobile communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunication System, UMTS), a worldwide interoperability for microwave access (Worldwide Interoperability for Microwave Access, WiMAX) communications system, a 5G system, NR, or the like.

Figure 1:
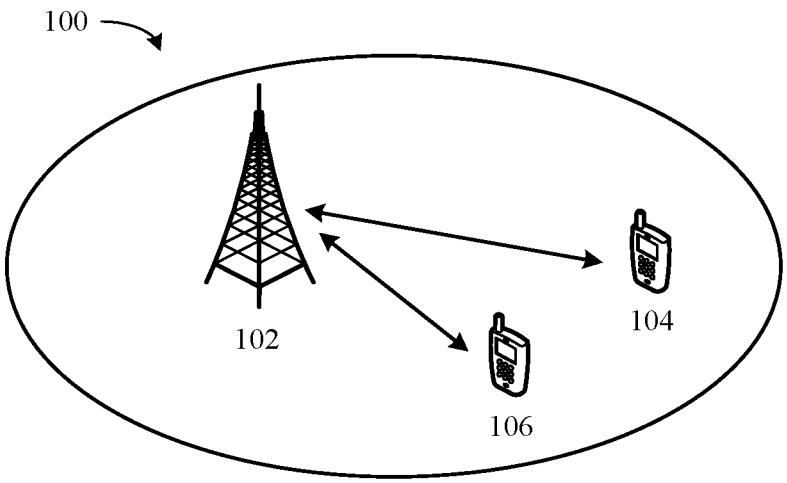
FIG. 1 is a schematic diagram of a communications system to which a communication method according to an embodiment of this application is applicable.

For ease of understanding the embodiments of this application, a communications system shown in FIG. 1 is first used as an example to describe in detail a communications system to which the embodiments of this application are applicable. FIG. 1 is a schematic diagram of a communications system 100 to which a communication method according to an embodiment of this application is applicable. As shown in FIG. 1, the communications system 100 may include at least one access network device (for example, an access network device 102 shown in the figure) and at least two terminal devices (for example, a terminal device 104 and a terminal device 106 shown in the figure). The access network device 102 may separately perform wireless communication with the terminal device 104 and the terminal device 106. Optionally, the communications system 100 may further include more access network devices and/or more terminal devices. This is not limited in this application.

The access network device may include a device that communicates with a wireless terminal over an air interface in an access network by using one or more sectors. The access network system may be used to mutually convert a received over-the-air frame and an internet protocol (Internet Protocol, IP) packet and serve as a router between the wireless terminal and a rest portion of the access network, and the rest portion of the access network may include an IP network. The radio access network system may further coordinate attribute management for the air interface. It should be understood that the access network device includes but is not limited to: an evolved NodeB (evolved NodeB, eNB), a radio network controller (Radio Network Controller, RNC), a NodeB (NodeB, NB), a base station controller (Base Station Controller, BSC), a base transceiver station (Base Transceiver Station, BTS), a home evolved NodeB (for example, Home evolved NodeB, or Home NodeB, HNB), a baseband unit (BaseBand Unit, BBU), an access point (Access Point, AP) in a wireless fidelity (Wireless Fidelity, Wi-Fi) system, a wireless relay node, a wireless backhaul node, a transmission and reception point (transmission and reception point, TRP, or transmission point, TP), or the like. The access network device may alternatively be a gNB or a transmission point (TRP or TP) in a 5G system, for example, an NR system, or one antenna panel or a group of antenna panels (including a plurality of antenna panels) of a base station in a 5G system, or may be a network node, such as a baseband unit (BBU) or a distributed unit (distributed unit, DU), that constitutes a gNB or a transmission point.

In some deployments, the gNB may include a centralized unit (centralized unit, CU) and a DU. The gNB may further include a radio frequency unit (radio unit, RU). The CU implements some functions of the gNB, and the DU implements some functions of the gNB. For example, the CU implements functions of a radio resource control (radio resource control, RRC) layer and a packet data convergence protocol (packet data convergence protocol, PDCP) layer, and the DU implements functions of a radio link control (radio link control, RLC) layer, a media access control (media access control, MAC) layer, and a physical (physical, PHY) layer. Information at the RRC layer eventually becomes information at the PHY layer, or is obtained by converting information at the PHY layer. Therefore, in the architecture, higher layer signaling, for example, RRC layer signaling, may alternatively be considered as being sent by the DU or sent by the DU and the CU. It may be understood that the access network device may be a CU node, a DU node, or a device including a CU node and a DU node. In addition, the CU may be classified into an access network device in an access network (radio access network, RAN), or the CU may be classified into an access network device in a core network (core network, CN). This is not limited herein.

The terminal device may also be referred to as user equipment (user equipment, UE), an access terminal, a subscriber unit, a subscriber station, a mobile station, a mobile station, a remote station, a remote terminal, a mobile device, a user terminal, a terminal, a wireless communications device, a user agent, or a user apparatus. The terminal device in the embodiments of this application may be a mobile phone (mobile phone), a tablet (Pad), a computer with a wireless transceiving function, a virtual reality (virtual reality, VR) terminal device, an augmented reality (augmented reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of this application.

In the communications system 100, it is assumed that the terminal device 104 and the terminal device 106 may be located in a serving cell of the access network device 102. When the terminal device 104 communicates with the terminal device 106, for example, when the terminal device 104 sends data to the terminal device 106, the terminal device 104 may transmit the data to the access network device 102 on a physical uplink resource (for example, a physical uplink shared channel) scheduled by the access network device 102. After receiving the data, the access network device may further send the data to a core network device, for example, a serving gateway (serving gateway, SGW) and a packet data network gateway (packet data network gateway, PDN GW). The core network device performs operations such as internet protocol (Internet Protocol, IP) assignment and charging, and sends the data to an internet server. Then, the data is sent to the terminal device 106 through the core network device and an access network device (for example, the access network device 102).

Therefore, an end to end latency may include a processing latency of the terminal device, an air interface transmission latency between the terminal device and the access network device, a processing latency of the access network device, a processing latency of the core network device, a backhaul latency between the access network device and the core network device, and a latency between a core network and the internet server, and may further include a latency caused by resource scheduling.

It should be understood that the figure is merely an example for ease of understanding, and shall not constitute any limitation on this application. For example, the communications system 100 may further include the core network device, the internet server, and the like, which are not shown in the figure. For another example, the terminal device 104 and the terminal device 106 may be terminal devices located in different cells. For another example, when the terminal device 104 and the terminal device 106 are located in different cells, access network devices of the different cells may be connected to different core network devices. A network connection between the two terminal devices is not limited in this application.

It should be further understood that, a scenario of communication between two user equipments is shown in the figure only for ease of understanding. However, this should not constitute a limitation on a scenario to which the communication method provided in this application is applicable. For example, the communication method provided in this application may be further applicable to a scenario of communication between user equipment and an application server.

Network elements that may be involved in communication between two terminal devices are considered in the end to end latency described above. However, in the prior art, the access network device cannot accurately learn of a latency generated when a data packet waits for scheduling of a physical uplink resource inside the terminal device. Consequently, determining of a cause of the end to end latency is not accurate enough. Specifically, after the data packet is generated at an application layer, operations such as packet assembly and encapsulation may be performed on the data packet at protocol layers, and then the data packet arrives at a MAC layer. The MAC layer sends, to the access network device, an uplink resource scheduling request, for example, a scheduling request (scheduling request, SR) or a buffer status report (BSR). After receiving an uplink grant (UL grant), the MAC layer sends the data by using a granted physical uplink resource.

In a current technology, in a process in which the terminal device requests a resource for sending uplink data, the access network device uses a time interval between a time point of receiving a BSR MAC CE whose buffer size (Buffer Size) is greater than 0 and a time point of receiving a BSR MAC CE whose buffer size is equal to 0, as a resource scheduling latency. However, actually, before the terminal device sends a BSR MAC CE, in a time period between a time point at which a data packet arrives at an AS (for example, an SDAP layer, a PDCP layer, or an RLC layer) and a time point at which the BSR MAC CE is sent, a latency is also generated in a process in which the data packet waits in a buffer.

If the waiting latency of the data packet in the terminal device cannot be accurately learned of, when the waiting latency accounts for a relatively large proportion of the end to end latency, because the access network device does not know a main location and a main cause of the latency, the access network device cannot make a proper scheduling policy to reduce the waiting latency. As a result, the end to end latency cannot be actually reduced, and a latency gain cannot be increased.

In view of this, this application provides a communication method, to enable the access network device to accurately obtain the waiting time period of the data packet in the buffer.

Figure 2:
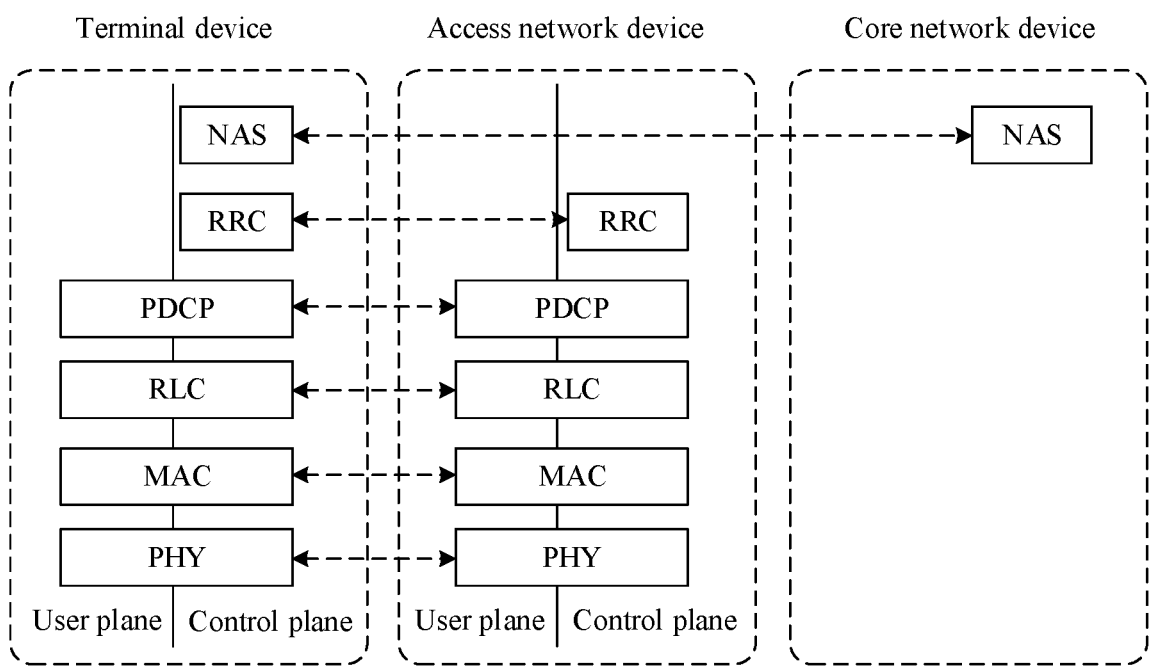
FIG. 2 is a schematic diagram of a protocol stack according to an embodiment of this application.

For ease of understanding the embodiments of this application, the following first briefly describes, with reference to FIG. 2, a structure of a protocol stack in LTE and an operation performed by each protocol layer on a data packet. FIG. 2 is a schematic structural diagram of user plane and control plane protocol stacks in LTE. As shown in the figure, a current structure of the user plane protocol stack in LTE may include four protocol layers, which may be a PDCP layer, an RLC layer, a MAC layer, and a physical (Physical, PHY) layer from top to bottom. Data generated by a transmit end device at any protocol layer (where the protocol layer is, for example, denoted as a protocol layer A, and it may be understood that the protocol layer A may be any one of the PDCP layer, the RLC layer, the MAC layer, and the PHY layer) is to be processed by a lower protocol layer of the protocol layer, and finally sent to a receive end device through a physical channel. Correspondingly, data received by the receive end device through the physical channel also needs to be processed by the PHY layer and an upper protocol layer of the PHY layer, and the data can be obtained when the data arrives at the protocol layer A.

In addition to the foregoing four protocol layers, the structure of the user plane protocol stack in LTE may further include an RRC layer. Signaling generated by a transmit end device at any protocol layer (where the protocol layer is, for example, denoted as a protocol layer B, and it may be understood that the protocol layer B may be any one of the RRC layer, the PDCP layer, the RLC layer, the MAC layer, and the PHY layer) is to be processed by a lower protocol layer of the protocol layer, and finally sent to a receive end device through a physical channel. Correspondingly, data received by the receive end device through the physical channel also needs to be processed by the PHY layer and an upper protocol layer of the PHY layer, and the data can be obtained only when the data arrives at the protocol layer A.

It may be understood that the RRC layer, the PDCP layer, the RLC layer, the MAC layer, and the PHY layer that are listed above may be referred to as an access stratum (access stratum, AS), and the access stratum may be understood as a protocol layer at which an access network works. An access stratum procedure is a procedure in which an access network device participates in processing. For example, procedures such as public land mobile network (public land mobile network, PLMN) selection, cell selection, and radio resource management may be included. Access stratum signaling is processed by the access network device.

In addition, in consideration of integrity, a non-access stratum (Non-Access Stratum, NAS) is further shown in the figure. The non-access stratum may be understood as a protocol layer at which a core network works. A non-access stratum procedure is a procedure in which a terminal device and the core network perform processing, and the access network device does not perform processing. For example, the non-access stratum procedure may include service establishment, service release, and mobility management. Non-access stratum signaling may be transparently transmitted from the access network to a core network device, and the access network device does not process the non-access stratum signaling. Access stratum signaling exchange may be used to establish a connection path between the terminal device and the core network device, so that the terminal device and the core network perform the non-access stratum signaling procedure.

It should be understood that, only for ease of understanding, the protocol stack in LTE is used as an example for description, and should not constitute any limitation on this application. This application does not exclude a possibility of combining one or more layers in the protocol stack in LTE or adding one or more protocol layers to the protocol stack in LTE for a future protocol. For example, in a user plane protocol stack in an NR protocol, a new protocol layer such as an SDAP layer may be added above a PDCP layer.

With reference to the protocol stack shown in FIG. 2, the following briefly describes, by using uplink transmission as an example, processing performed on data by the terminal device at each protocol layer.

It may be understood that each protocol layer may receive a data packet from an upper layer, process the data packet to generate a new data packet, and then transmit the new data packet to a lower protocol layer. At each protocol layer, the data packet from the upper layer may be referred to as a service data unit (SDU), and the data packet generated at the protocol layer is referred to as a protocol data unit (PDU). Therefore, in two adjacent protocol layers, a PDU of an upper protocol layer may be considered as an SDU of a lower protocol layer.

For example, after a PDCP PDU is transmitted to the RLC layer, the PDCP PDU may be referred to as an RLC SDU, and the RLC layer may generate an RLD PDU after processing the RLC SDU.

In the embodiments of this application, when a data packet at each protocol layer is described, the data packet may refer to an SDU, or refer to a PDU. A person skilled in the art may understand a meaning of the data packet.

First, in LTE, the terminal device may perform, at the PDCP layer, packet header compression on an internet protocol (Internet Protocol, IP) data packet from an upper layer, to reduce a quantity of bits transmitted through a radio interface, and may further encrypt the data packet, generate a PDCP PDU, and send the PDCP PDU to the RLC layer. The IP data packet from the upper layer may be obtained after data generated by the application layer is processed at a transmission control protocol (Transmission Control Protocol, TCP) layer and an IP layer.

Alternatively, in NR, the terminal device may perform, at the PDCP layer, packet header compression on a PDU from the SDAP layer, to generate a PDCP PDU, and then send the PDCP PDU to the RLC layer.

Then, the terminal device may segment or concatenate, at the RLC layer, the PDU from the PDCP layer, to generate an RLC PDU, and send the RLC PDU to the MAC layer. The RLC layer may provide a service for the PDCP layer. Alternatively, in NR, a data packet from an upper layer may not be concatenated.

Then, the terminal device may determine, at the MAC layer, a sending format for an air interface, for example, a size of a data block, a physical resource that matches the size of the data block, and an MCS that matches the physical resource. The terminal device may generate, based on the MCS, a MAC PDU (namely, a transport block (transport block, TB)) whose size matches the MCS, and send the MAC PDU to the physical layer. The MAC layer may provide a service for the RLC layer by using a logical channel (logical channel, LC). In addition, the MAC layer may further generate MAC layer control information, for example, a MAC control element (Control Element, CE) used to report data buffer information, power headroom, and the like that are used for scheduling by a base station. Therefore, the MAC PDU generated by the MAC layer may further include the MAC layer control information. This is not limited in this application.

Finally, the terminal device may perform, at the physical layer, processing such as channel coding, rate matching, interleaving, scrambling, and modulation on a transport block (transport block, TB) from the MAC layer, and transmit, through an antenna, a signal generated through modulation. The physical layer may provide a service for the MAC layer by using a transport channel (transport channel, TCH).

It should be understood that the foregoing example briefly describes, with reference to the structure of the protocol stack in LTE, operations performed on uplink data by the terminal device at each protocol layer. Processing performed by an access network device side on downlink data is similar to the foregoing operations. In addition, processing performed by the terminal device on downlink data and processing performed by the access network device on uplink data are opposite to the foregoing processes. Details are not described again. Specific implementation processes of the foregoing processes may be the same as those in the prior art. For brevity, details of the specific processes are not described herein.

To meet a plurality of service requirements of the terminal device, the access network device may configure one or more logical channels for each terminal device, and each logical channel may correspond to a QoS requirement of one service. For example, the terminal device may need both an internet access service and a voice service, and therefore two or more different logical channels may be configured for the terminal device, to receive or send data of different services.

An uplink data sending process is used as an example. Independent entities (entity) may be respectively established at the PDCP layer and the RLC layer for processing data of different services, and the data of different services each corresponds to one logical channel. As described above, the MAC layer may further generate the MAC layer control information, and a corresponding logical channel is allocated to the MAC layer control information. A MAC entity may multiplex one or more logical channels onto one transport channel, a PDU from the RLC layer and/or the MAC layer control information are/is mapped to a same PDU of the MAC layer (that is, a MAC PDU). In this way, a plurality of logical channels can be multiplexed onto a same transport channel through the mapping.

Several concepts in the embodiments are first briefly described to facilitate understanding of the embodiments of this application.

1. End to end (end to end, E2E) latency: An end to end latency may be understood as an end to end communication latency, for example, may be a terminal device-to-terminal device latency, or a terminal device-to-application server latency. Further, the end to end latency may include a processing latency of a terminal device, an air interface transmission latency between the terminal device and an access network device, a processing latency of the access network device, a processing latency of a core network device, a backhaul latency between the access network device and the core network device, and a latency between a core network and an internet server, and may further include a latency caused by resource scheduling.

2. MAC CE: A MAC CE is used to transmit control signaling of a MAC layer. Each MAC CE may include one logical channel identifier (LCID), and one LCID may be used to uniquely identify one MAC CE. The LCID is used, so that a MAC SDU or the MAC CE does not need to be identified by an additional field in a MAC header.

3. BSR MAC CE: When the terminal device needs to transmit uplink data, the terminal device may send a BSR to obtain a physical uplink resource.

In a possible design, the BSR may be a BSR MAC CE. The BSR MAC CE may include an LCG ID field and a buffer size field. The LCG ID field is used to indicate a logical channel group corresponding to the buffer status report, and may occupy 2 bits. The buffer size field is used to indicate a total amount of data on all logical channels in the logical channel group corresponding to the LCG ID after all MAC PDUs are generated. The total amount of the data may be indicated by using a quantity of bytes. The total amount of the data may include all data that can be used for transmission at an RLC layer and a PDCP layer. The BSR MAC CE is sent to the access network device, so that the access network device may schedule a physical uplink resource for the terminal device based on the total amount of the data reported by the terminal device. In other words, the "buffer" herein may be a buffer at the RLC layer and a buffer at the PDCP layer. This is not limited in this application.

Figure 3:
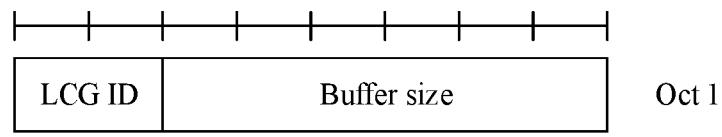
FIG. 3 is a schematic diagram of a BSR MAC CE in a short BSR format and a truncated BSR format according to an embodiment of this application.
Figure 4:
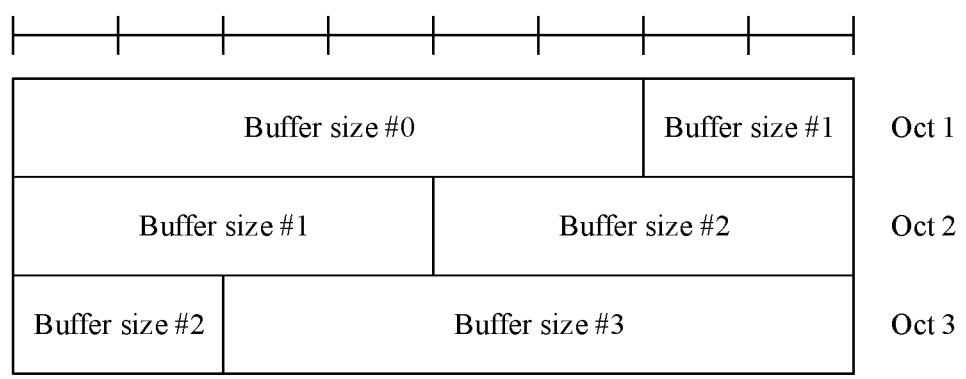
FIG. 4 is a schematic diagram of a BSR MAC CE in a long BSR format according to an embodiment of this application.

The BSR MAC CE may be classified into a short BSR (short BSR) format, a truncated BSR (truncated BSR) format, or a long BSR (long BSR) format. The BSR MAC CE in the short BSR format or the truncated BSR format may include one LCG ID field and one corresponding buffer size field. FIG. 3 shows the BSR MAC CE in the short BSR format or the truncated BSR format. The BSR MAC CE in the long BSR format may include four buffer size fields that correspond to an LCG ID #0 to an LCG ID #3. FIG. 4 shows the BSR MAC CE in the long BSR format. One octet (Oct, octet) in the figure represents a byte (byte) consisted of 8 bits (bits).

It should be understood that the formats of the BSR MAC CEs shown in the figures are two possible formats defined in an existing protocol (for example, an LTE protocol). This is merely an example for ease of understanding, and shall not constitute any limitation on this application. In the embodiments of this application, an improvement is made based on the format of the BSR MAC CE. The following provides detailed descriptions with reference to specific embodiments.

4. Uplink grant (UL grant): After receiving the BSR MAC CE or an SR from the terminal device, the access network device may schedule a physical uplink resource for the terminal device. Indication of the scheduled physical uplink resource may be indication of a modulation and coding scheme (modulation coding scheme, MCS) and resource allocation (resource allocation) by using an uplink grant. For example, the physical uplink resource may be dynamically scheduled, and the uplink grant may be physical layer signaling such as downlink control information (downlink control information, DCI). Alternatively, the physical uplink resource may be semi-persistently scheduled, and the uplink grant may be higher layer signaling such as an RRC message, or may be physical layer signaling such as DCI. This is not limited in this application.

5. Logical channel group (logical channel group, LCG): One or more logical channels may be grouped into one logical channel group based on content in the logical channels, and one logical channel group may correspond to one service type. For example, the logical channel group may include a control channel group and a traffic channel group. The control channel group may include, for example, a broadcast control channel (broadcast control channel, BCCH), a paging control channel (paging control channel, PCCH), a common control channel (common control channel, CCCH), and a dedicated control channel (dedicated control channel, DCCH). The traffic channel group may include, for example, a dedicated traffic channel (dedicated traffic channel, DTCH), and a common traffic channel (common traffic channel, CTCH).

It should be understood that the logical channels and the logical channel groups listed above are merely examples, and should not constitute any limitation on this application.

6. Radio bearer (radio bearer, RB): A bearer that is evolved packet system (Evolved Packet System, EPS) bearers and that is between a terminal device and an access network device is referred to as a radio bearer. Based on different carried content, the radio bearer may be classified into a signaling radio bearer (signaling RB, SRB) or a data radio bearer (data RB, DRB). The SRB may be used to carry control plane data, that is, signaling. In LTE or NR, the SRB is classified into an SRB 0, an SRB 1, or an SRB 2 based on the carried signaling. The DRB is used to carry user plane data. In LTE or NR, eight DRBs may be established between the terminal device and the access network device based on different quality of service (quality of service, QoS).

7. Network slice (network slice): Based on different service requirements, a physical network may be further divided into a plurality of virtual networks, and each virtual network is obtained through division based on different service requirements, such as a latency, bandwidth, security, or reliability, to flexibly cope with different network application scenarios. Compared with the radio bearer, a division granularity of the network slices is finer.

For example, in NR, based on different requirements of three types of application scenarios on a network service, network slices may be classified into a network slice used for enhanced mobile broadband (enhanced mobile broadband, eMBB), a network slice used for massive machine type communication (massive machine type communication, mMTC), and a network slice used for ultra-reliable low-latency communication (ultra-reliable and low latency communication, URLLC).

Network slicing may be implemented through network function virtualization (network function virtualization). In other words, different types of network slices are implemented by using network nodes with virtualized functions. Similarly, a data packet transmitted on the network slice may also be processed by each protocol layer in sequence and then sent out.

8. Jitter (jitter): A jitter is an absolute value of a difference between forwarding latencies of two adjacent frames transmitted in sequence in IP-based video and audio services.

The following describes the embodiments of this application in detail with reference to the accompanying drawings.

It should be understood that, in the following embodiments, "first" and "second" are merely intended to distinguish between different objects, and shall not constitute any limitation on this application. For example, "first" and "second" are used to distinguish different MAC CEs, different RRC messages, or different indication information. In the following embodiments, for ease of distinguishing and description, indication information used to indicate a data packet type in a method 200 is denoted as first indication information of the data packet type, and indication information used to indicate a data packet type in a method 300 is denoted as second indication information of the data packet type; indication information used to indicate a reporting granularity in the method 200 is denoted as first indication information of the reporting granularity, and indication information used to indicate a reporting granularity in the method 300 is denoted as second indication information of the reporting granularity; and so on. Examples are not listed one by one herein. In addition, for ease of distinguishing and description, a MAC CE used to carry buffer latency information in the method 200 is denoted as a first MAC CE, and a MAC CE used to carry buffer latency information in the method 300 is denoted as a second MAC CE; and an RRC message used to carry information about a jitter level in the method 200 is denoted as a first RRC message, and an RRC message used to carry information about a jitter level in the method 300 is denoted as a second RRC message.

It should be further understood that, in the embodiments shown below, "obtained in advance" may include being indicated by signaling of an access network device or predefined, for example, defined in a protocol. "Predefined" may be implemented by prestoring corresponding code or a corresponding table in a device (for example, including a terminal device and an access network device), or another manner that may be used to indicate related information. A specific implementation is not limited in this application.

It should be further understood that, "storing" in the embodiments of this application may refer to storing in one or more memories. The one or more memories may be separately disposed, or may be integrated into an encoder or a decoder, a processor, or a communications apparatus. Alternatively, some of the one or more memories may be separately disposed, and the others are integrated into a decoder, a processor, or a communications apparatus. The memory may be a storage medium in any form. This is not limited in this application.

It should be further understood that, in the embodiments of this application, the terms "network" and "system" are usually interchangeably used, but meanings of the terms may be understood by a person skilled in the art. The terms "Of (of)", "corresponding (corresponding, relevant)", and "corresponding (corresponding)" may be interchangeably used sometimes. It should be noted that meanings expressed by the terms are consistent when differences of the terms are not emphasized.

It should be further understood that, in the embodiments of this application, a "protocol" may be a standard protocol in the communications field, for example, may include an LTE protocol, an NR protocol, and a related protocol applied to a future communications system. This is not limited in this application.

It should be further understood that, the term "and/or" describes an association relationship between associated objects and represents that three relationships may exist. For example, A and/or B may represent the following three cases: Only A exists, both A and B exist, and only B exists. A character "I" usually indicates an "or" relationship between associated objects. The term "at least one" means one or more. The term "at least one of A and B", similar to the term "A and/or B", describes an association relationship between associated objects and represents that three relationships may exist. For example, at least one of A and B may represent the following three cases: Only A exists, both A and B exist, and only B exists.

It should be understood that the communication method provided in this application may be applicable to a wireless communications system, for example, the wireless communications system 100 shown in FIG. 1. There is a wireless communication connection between two communications apparatuses in the wireless communications system. One of the two communications apparatuses may correspond to the terminal device 104 or the terminal device 106 shown in FIG. 1, for example, may be the terminal device 104 in FIG. 1, or a chip disposed in the terminal device 104; or may be the terminal device 106 in FIG. 1, or a chip disposed in the terminal device 106. The other one of the two communications apparatuses may correspond to the access network device 102 shown in FIG. 1, for example, may be the access network device 102 in FIG. 1, or a chip disposed in the access network device 102.

Without loss of generality, the following describes the embodiments of this application in detail by using an interaction process between the terminal device and the access network device as an example. It may be understood that any terminal device in the wireless communications system may report a latency to the access network device by using a same method. This is not limited in this application.

Figure 5:
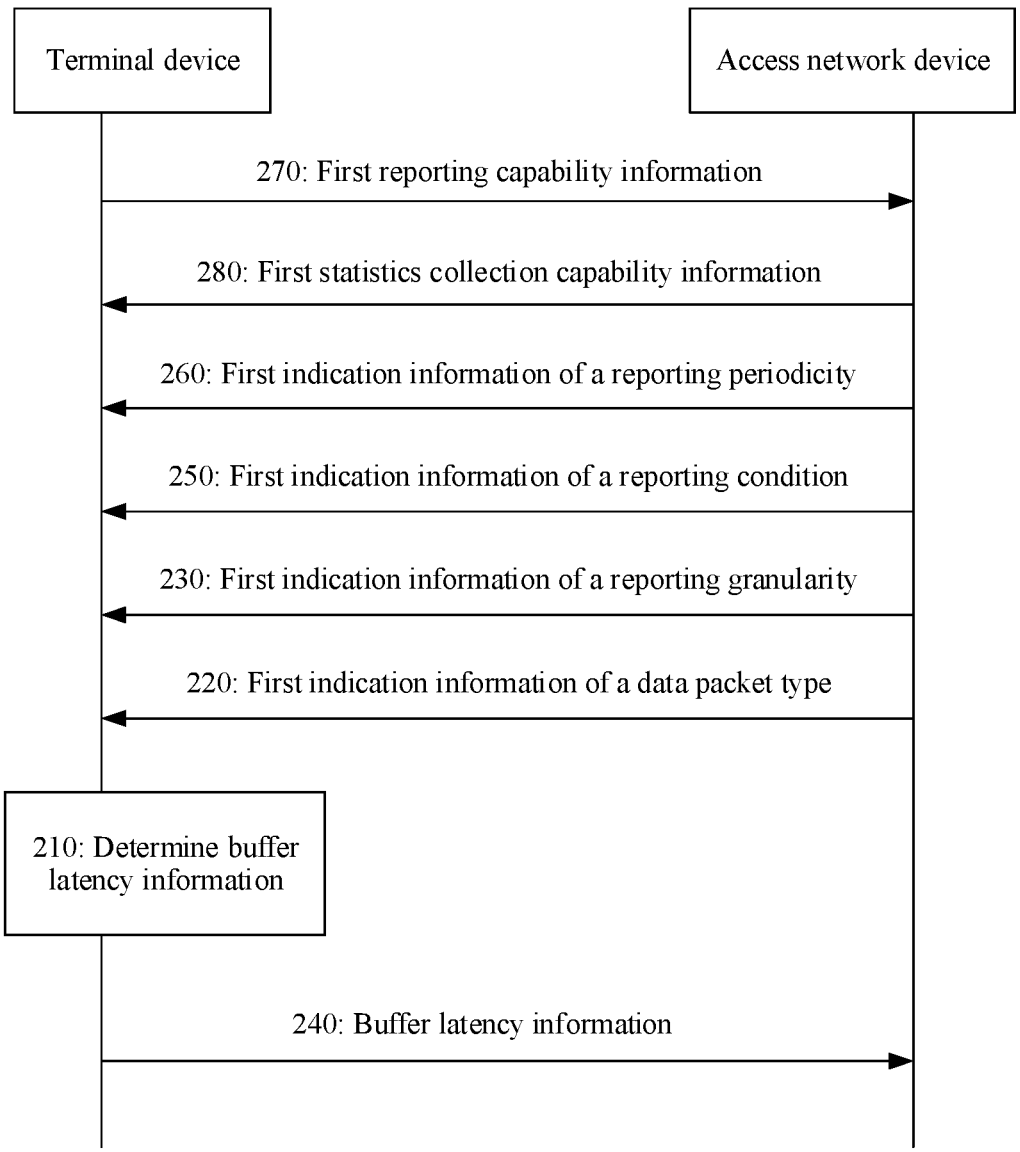
FIG. 5 is a schematic flowchart of a communication method according to an embodiment of this application.

FIG. 5 is a schematic flowchart of the communication method 200 from a perspective of device interaction according to an embodiment of this application. As shown in the figure, the method 200 shown in FIG. 5 may include step 210 to step 280. The following describes the communication method in detail with reference to FIG. 5.

In step 210, a terminal device determines buffer latency information, where the buffer latency information may be determined based on a buffer latency of one or more measured data packets.

Optionally, the buffer latency information is used to indicate:

(a) a buffer latency of one data packet;

(b) a buffer latency of each of a plurality of data packets; or (c) an average value, a maximum value, a minimum value, or an accumulated value of buffer latencies of a plurality of data packets.

Specifically, the buffer latency information may be used to indicate any one of (a), (b), and (c), for example, may be used to indicate (a), may be used to indicate (b), or may be used to indicate (c).

It should be understood that specific content of the buffer latency information reported by the terminal device may be indicated by an access network device in advance, or may be predefined, for example, defined in a protocol. This is not limited in this application. Herein, the buffer latency may refer to a time interval between a time point at which a data packet arrives at an AS and a time point at which a corresponding BSR is sent, or may refer to a time interval between a time point at which a data packet arrives at an AS and a time point at which a corresponding uplink grant is received. In other words, a start moment of the buffer latency may be a moment at which the data packet arrives at the AS, and an end moment of the buffer latency may be a moment at which the BSR is sent, or may be a moment at which the uplink grant is received. The BSR may be a BSR used by the terminal device to request to send the data packet, and the uplink grant may be an uplink grant delivered by the access network device for a physical uplink resource scheduled by using the BSR.

As described above, the AS may include an SDAP layer, a PDCP layer, an RLC layer, a MAC layer, and a PHY layer. The terminal device starts to perform MAC layer packet assembly on a data packet from an upper layer only after the MAC layer receives the uplink grant. Therefore, in this embodiment, that the data packet arrives at the AS may mean that the data packet arrives at any one of the SDAP layer, the PDCP layer, or the RLC layer. Correspondingly, a data packet arriving at the SDAP layer may be referred to as an SDAP SDU, a data packet arriving at the PDCP layer may be referred to as a PDCP SDU or an SDAP PDU, a data packet arriving at the RLC layer may be referred to as an RLC SDU or a PDCP PDU, a data packet arriving at the MAC layer may be referred to as a MAC SDU or an RLC PDU, and a data packet arriving at the physical layer may be referred to as a MAC PDU.

As an example instead of a limitation, a data packet includes: an SDAP SDU, an SDAP PDU, a PDCP PDU, an RLC PDU, or a MAC PDU.

When the data packet is transmitted between the protocol layers, sequence numbers of the data packet at the layers may be different, but may have a correspondence. For example, when a PDCP PDU arrives at the RLC layer, the PDCP PDU may be segmented or concatenated. The PDCP PDU may carry a sequence number. After the PDCP PDU is segmented or concatenated by the RLC layer to obtain one or more RLC PDUs, a sequence number of the RLC PDUs may be obtained, so that a correspondence between the sequence number of the PDCP PDU and the sequence number of the RLC PDUs may be obtained. The RLC layer may notify an adjacent protocol layer of the correspondence by using an inter-layer primitive. For another example, when a plurality of RLC PDUs arrive at the MAC layer, the plurality of RLC PDUs may be multiplexed into a same MAC PDU. The RLC PDUs may carry sequence numbers of the RLC PDUs at the RLC layer. After the MAC layer performs packet assembly on the plurality of RLC PDUs to obtain one MAC PDU, a sequence number of the MAC PDU may be obtained, so that a correspondence between the sequence numbers of the RLC PDUs and the sequence number of the MAC PDU may be obtained. The MAC layer may also notify an adjacent protocol layer of the correspondence by using an inter-layer primitive. Therefore, the MAC layer may determine, based on a correspondence between sequence numbers of data packets at the protocol layers, a buffer latency of any type of data packet listed above.

Therefore, optionally, step 210 specifically includes:

The terminal device determines the buffer latency information based on the data packet type.

To be specific, the buffer latency information may be determined based on a buffer latency of one or more data packets corresponding to the data packet type.

Specifically, before determining the buffer latency, the terminal device may predetermine a type of a data packet whose buffer latency needs to be reported, that is, determine a start time point of the buffer latency. The data packet type may be predefined. For example, it is defined in a protocol that the data packet reported by the terminal device is an SDAP PDU, a PDCP PDU, an RLC PDU, or the like. Alternatively, the data packet type may be indicated by the access network device to the terminal device in advance.

If the data packet type is indicated by the access network device, optionally, the method 200 further includes step 220: The terminal device receives first indication information of the data packet type.

Correspondingly, in step 220, the access network device sends the first indication information of the data packet type.

Specifically, the data packet type may be related to the start moment of the buffer latency. After the data packet type is determined, a protocol layer at which the data packet arrives and from which the buffer latency starts to be calculated is determined.

For example, if the access network device indicates that the data packet type is an SDAP PDU, the terminal device calculates the buffer latency from a moment at which the data packet arrives at the SDAP layer. In other words, the moment at which the data packet arrives at the SDAP layer is used as the start moment for calculating the buffer latency.

In a possible implementation, when the data packet arrives at each protocol layer, the terminal device adds a timestamp to the data packet, to identify a time point at which the data packet arrives at each protocol layer. Then, the terminal device may further determine a required buffer latency of the data packet based on the data packet type. It should be understood that a possible implementation of determining the buffer latency of the data packet is listed herein only for ease of understanding. However, this shall not constitute any limitation on this application. A specific implementation of determining the buffer latency of the data packet is not limited in this application.

In addition, before determining the buffer latency, the terminal device may further predetermine a reporting granularity. Optionally, the reporting granularity may include a data packet, a logical channel, a logical channel group, a network slice, or a radio bearer.

The reporting granularity may be predefined, for example, defined in a protocol, or may be indicated by the access network device to the terminal device in advance.

If the reporting granularity is indicated by the access network, optionally, the method 200 further includes step 230: The terminal device receives first indication information of the reporting granularity.

Correspondingly, in step 230, the access network device sends the first indication information of the reporting granularity.

Specifically, the terminal device may report the buffer latency information to the access network device based on different granularities.

Further, optionally, step 210 specifically includes: The terminal device determines the buffer latency information based on the reporting granularity.

To be specific, the buffer latency information may be determined based on a buffer latency of one or more data packets corresponding to the reporting granularity.

Regardless of which reporting granularity is used to report the buffer latency information, the terminal device may determine the buffer latency by using the data packet as a minimum unit. Therefore, the buffer latency information is definitely determined based on the buffer latency of the one or more data packets. In addition, the one or more data packets may be data packets corresponding to the reporting granularity. In other words, the terminal device may determine the buffer latency information with reference to the data packet type and the reporting granularity, to report the buffer latency information to the access network device.

For example, if the reporting granularity is a data packet, the data packet may be any one of an SDAP layer data packet, a PDCP layer data packet, or an RLC layer data packet. The terminal device may calculate a corresponding buffer latency based on each data packet, and report the buffer latency of each data packet to the access network device. When there are a plurality of data packets, the terminal device may alternatively report an average value, a maximum value, a minimum value, or an accumulated value of buffer latencies of the plurality of data packets to the access network device.

If the reporting granularity is a logical channel, a corresponding data packet may be an RLC PDU carried on the logical channel, or may be a data packet, at another protocol layer, that corresponds to the RLC PDU, for example, a PDCP PDU or a MAC PDU. The terminal device may calculate a corresponding buffer latency based on each data packet, and directly report the buffer latency of each data packet to the access network device. When there are a plurality of data packets, the terminal device may alternatively report an average value, a maximum value, a minimum value, or an accumulated value of buffer latencies of the plurality of data packets to the access network device.

If the reporting granularity is a logical channel group, a corresponding data packet may be an RLC PDU, or may be a data packet, at another protocol layer, that corresponds to the RLC PDU. The terminal device may report, to the access network device based on one or more logical channels included in each logical channel group, buffer latencies of RLC data packets carried on the logical channels, or may report, to the access network device, an average value, a maximum value, a minimum value, or an accumulated value of the buffer latencies of the RLC data packets carried on the logical channels.

If the reporting granularity is a network slice, a corresponding data packet may be any one of an SDAP PDU, a PDCP PDU, an RLC PDU, or a MAC PDU. Because data transmitted on a same network slice may be carried in one or more data packets, the terminal device may determine the buffer latency information based on the data packets carrying the data on each network slice. The data packets carrying the data on the same network slice may be referred to as data packets corresponding to the network slice. The terminal device may report, to the access network device, a buffer latency of the one or more data packets corresponding to the same network slice. When the same network slice corresponds to a plurality of data packets, the terminal device may alternatively report, to the access network device, an average value, a maximum value, a minimum value, or an accumulated value of buffer latencies of the plurality of data packets corresponding to the same network slice.

If the reporting granularity is a radio bearer, a corresponding data packet may be any one of an SDAP PDU, a PDCP PDU, an RLC PDU, or a MAC PDU. Because data transmitted on a same radio bearer may be carried in one or more data packets, the terminal device may determine the buffer latency information based on the data packets carrying the data on each radio bearer. The data packets carrying the data on the same radio bearer may be referred to as data packets corresponding to the radio bearer. The terminal device may report, to the access network device, a buffer latency of the one or more data packets corresponding to the same radio bearer. When the same radio bearer corresponds to a plurality of data packets, the terminal device may alternatively report, to the access network device, an average value, a maximum value, a minimum value, or an accumulated value of buffer latencies of the plurality of data packets corresponding to the same radio bearer.

It should be understood that the foregoing reporting granularities are merely several possible implementations, and should not constitute any limitation on this application. This application does not exclude a possibility of defining more or fewer reporting granularities in a future protocol.

In this embodiment of this application, the buffer latency information corresponding to the reporting granularity may be determined by measuring the buffer latency of the one or more data packets based on the reporting granularity. The one or more measured data packets may be referred to as a measurement object. It may be understood that each measurement object may correspond to one piece of buffer latency information, and each measurement object may be defined based on the reporting granularity.

In step 240, the terminal device sends the buffer latency information.

Correspondingly, the access network device receives the buffer latency information.

After determining the buffer latency information, the terminal device may report the buffer latency information to the access network device.

Optionally, the method 200 further includes:

The terminal device sends an identifier corresponding to the reporting granularity.

Correspondingly, the access network device receives the identifier corresponding to the reporting granularity.

As described above, the one or more measured data packets corresponding to the reporting granularity are referred to as the measurement object, and the identifier corresponding to the reporting granularity of the buffer latency information is referred to as an identifier of the measurement object.

In this embodiment of this application, the buffer latency information and the identifier corresponding to the reporting granularity of the buffer latency information may be carried in same signaling for sending. For example, the buffer latency information and the identifier are carried in a same MAC CE or in a same RRC message. This is not limited in this application.

The buffer latency information and the identifier of the measurement object of the buffer latency information are sent, so that the access network device can more accurately determine, based on the identifier of the measurement object of the buffer latency information, a main location at which a latency is generated, to schedule a resource in a targeted manner. For example, when determining that a buffer latency indicated by buffer latency information of a logical channel is greater than buffer latencies indicated by buffer latency information of other logical channels, the access network device may preferentially schedule a resource for the logical channel, to reduce a buffer latency that may be generated when the logical channel is used to transmit a data packet next time. For the other reporting granularities, the access network device may also use a same manner to reduce a buffer latency.

It may be understood that, because types of data packets are different, sequence numbers of the data packet at different protocol layers may be different. For example, a PDCP PDU may be segmented into a plurality of RLC PDUs after arriving at the RLC layer, and sequence numbers of the plurality of RLC PDUs at the RLC layer may be consecutive. Alternatively, a plurality of PDCP PDUs may be concatenated into one RLC PDU after arriving at the RLC layer. Therefore, a sequence number of one PDCP PDU may correspond to sequence numbers of a plurality of RLC PDUs at the RLC layer, or sequence numbers of a plurality of PDCP PDUs may correspond to a sequence number of one RLC PDU at the RLC layer. For another example, after arriving at the MAC layer, a plurality of RLC PDUs may be multiplexed into one MAC PDU. Therefore, sequence numbers of the plurality of RLC PDUs may correspond to a sequence number of the same MAC PDU at the MAC layer.

If a PDCP PDU is segmented into a plurality of RLC PDUs when arriving at the RLC layer, when the reporting granularity is the data packet and the MAC CE carries a sequence number of an RLC PDU, if a buffer latency of the RLC PDU accounts for a relatively large proportion in a total latency, the access network device may preferentially schedule, based on the sequence number of the RLC PDU, a resource for an RLC PDU with a sequence number adjacent to that of the RLC PDU. Therefore, a buffer latency of the entire PDCP PDU is reduced, and the latency of the data packet of the entire PDCP PDU is controlled to be close to a latency length. This can reduce a jitter and improve user experience.

To reduce overheads and processing load of the access network device, the terminal device may further report the buffer latency information based on one or two of the following:

(1) a reporting condition; and
(2) a reporting periodicity.

To be specific, the terminal device may report the buffer latency information only when the reporting condition is met, or may report the buffer latency information based on only a determined reporting periodicity, or may report the buffer latency information based on the reporting periodicity when the reporting condition is met.

The following separately describes (1) and (2) in detail.

(1) Reporting condition

The reporting condition may be understood as a condition for triggering the terminal device to report the buffer latency information. When the terminal device meets the reporting condition, the terminal device determines to start to report the buffer latency information to the access network device. To be specific, optionally, step 240 specifically includes: The terminal device sends the buffer latency information when the reporting condition is met.

It should be noted that this does not mean that the terminal device does not collect the buffer latency before the reporting condition is met. The terminal device may collect the buffer latency and collect statistics about the buffer latency information in real time or periodically, and start to report the buffer latency information when the reporting condition is met. Alternatively, the terminal device may start to collect the buffer latency or start to collect statistics about the buffer latency information after the reporting condition is met, to report the buffer latency information to the access network device. This is not limited in this application.

In a possible design, the reporting condition is unrelated to the buffer latency, and whether the terminal device collects the buffer latency or collects statistics about the buffer latency information may not be directly related to whether the reporting condition is met. For example, the reporting condition may be that a quantity of data packets stored in a buffer is greater than or equal to a preset threshold.

In another possible design, the reporting condition is related to the buffer latency, and the terminal device may alternatively determine, based on the buffer latency, whether the reporting condition is met. For example, the reporting condition may be that a buffer latency of a data packet is greater than a preset threshold, or buffer latency information of a network slice is greater than a preset threshold.

It should be understood that the foregoing listed reporting condition is merely an example for description, and shall not constitute any limitation on this application. Specific content of the reporting condition is not limited in this application.

In this embodiment of this application, the reporting condition may be predefined, for example, defined in a protocol, or may be notified by the access network device to the terminal device in advance. If the access network device notifies the terminal device of the reporting condition in advance, optionally, the method 200 further includes step 250: The terminal device receives first indication information of the reporting condition. It may be understood that the first indication information of the reporting condition is indication information used to indicate the reporting condition. For expressions of various types of indication information (for example, the first indication information and the second indication information) in this application, refer to the foregoing understanding. Details are not described below.

Correspondingly, in step 250, the access network device sends the first indication information of the reporting condition.

When determining that a currently buffered data packet meets the reporting condition, the terminal device may report the buffer latency information to the access network device. Therefore, when the buffer latency is relatively long, the access network device may properly schedule a resource based on the buffer latency, to reduce the buffer latency through timely processing. This helps reduce the end-to-end latency.

(2) Reporting periodicity

Optionally, step 240 specifically includes: The terminal device sends the buffer latency information based on the reporting periodicity.

The reporting periodicity of reporting the buffer latency information by the terminal device may be predefined, for example, defined in a protocol, or may be notified by the access network device to the terminal device in advance. If the access network device notifies the terminal device of the reporting periodicity in advance, optionally, the method 200 further includes step 260: The terminal device receives first indication information of the reporting periodicity.

Correspondingly, in step 260, the access network device sends the first indication information of the reporting periodicity.

Optionally, the reporting periodicity may be 5 ms, 10 ms, 15 ms, 20 ms, 25 ms, 30 ms, 35 ms, 40 ms, 45 ms, 50 ms, 55 ms, 60 ms, 65 ms, 70 ms, 75 ms, 80 ms, 85 ms, 90 ms, 95 ms, 100 ms, 110 ms, 120 ms, 130 ms, 140 ms, 150 ms, 160 ms, 170 ms, 180 ms, 190 ms, or 200 ms.

Compared with real-time reporting, that the terminal device periodically reports the buffer information to the access network device can reduce overheads and processing load of the terminal device; and can also reduce processing load of the access network device because the access network device does not need to perform statistics collection and processing in real time on the buffer latency information reported by the terminal device.

Optionally, before step 210 to step 260, the method 200 further includes step 270: The terminal device sends first reporting capability information, where the first reporting capability information is used to indicate that the terminal device has a capability of reporting the buffer latency information.

Correspondingly, in step 270, the access network device receives the first reporting capability information.

After accessing the access network device, the terminal device may first send the first reporting capability information to the access network device, so that the access network device makes a corresponding response based on the reporting capability.

Optionally, the method 200 further includes step 280: The terminal device receives first statistics collection capability information, where the first statistics collection capability information is used to indicate that the access network device has a capability of collecting statistics about the buffer latency information.

Correspondingly, in step 280, the access network device sends the first statistics collection capability information.

The first statistics collection capability information may be used as a response to the first reporting capability information sent by the terminal device in step 270, or may be sent to the terminal device before step 270, so that the access network device learns of whether the terminal device has the capability of reporting the buffer latency information. A sequence of performing step 270 and step 280 is not limited in this application.

After the terminal device and the access network device notify each other that they respectively have the capability of reporting the buffer latency information and the capability of collecting statistics about the buffer latency information, the terminal device may perform step 210 to determine the buffer latency information.

Alternatively, if the terminal device first sends the first reporting capability information to the access network device, the access network device may not send the first statistics collection capability information, but may directly send any one of the first indication information of the reporting granularity, the first indication information of the data packet type, the first indication information of the reporting periodicity, and the first indication information of the reporting condition to the terminal device, to implicitly notify the terminal device that the access network has the capability of collecting statistics about the buffer latency information. It may be understood that the foregoing first indication information may be carried in different information or information elements, or may be carried in same information or a same information element. For example, one piece of first indication information not only indicates the reporting granularity, but also indicates the reporting periodicity. In this application, for other indication information (for example, second indication information), refer to the foregoing understanding. Details are not described in this application.

In this embodiment of this application, the buffer latency information may be carried in higher layer signaling.

Optionally, step 240 specifically includes:

The terminal device sends a first MAC CE, where the first MAC CE carries the buffer latency information.

Correspondingly, the access network device receives the first MAC CE, where the first MAC CE carries the buffer latency information.

Specifically, the first MAC CE may be a new MAC CE added by the terminal device, in other words, an independent MAC CE, and the MAC CE carries the buffer latency information. Alternatively, the first MAC CE may be a MAC CE generated by the terminal device through extending a field of an existing MAC CE (for example, a BSR MAC CE). This is not limited in this application.

In a possible design, the first MAC CE includes a first field and a second field corresponding to the first field, the first field is used to indicate the identifier of the measurement object, and the second field is used to indicate the buffer latency information of the measurement object.

Optionally, the first MAC CE includes N first fields and N second fields, the N first fields are in a one-to-one correspondence with the N second fields, and N is an integer greater than or equal to 1.

An $n^{th}$ first field is used to indicate an identifier of a measurement object, and an $n^{th}$ second field is used to indicate buffer latency information of the measurement object indicated by the $n^{th}$ first field, where $1 \leq n \leq N$, and n is an integer.

Specifically, the $n^{th}$ first field is used to indicate an identifier of a logical channel, and the $n^{th}$ second field is used to indicate buffer latency information of one or more data packets carried on the logical channel indicated by the $n^{th}$ first field;

the $n^{th}$ first field is used to indicate an identifier of a logical channel group, and the $n^{th}$ second field is used to indicate buffer latency information of one or more data packets carried on one or more logical channels in the logical channel group indicated by the $n^{th}$ first field;

the $n^{th}$ first field is used to indicate an identifier of a network slice, and the $n^{th}$ second field is used to indicate buffer latency information of one or more data packets transmitted on the network slice indicated by the $n^{th}$ first field; or the $n^{th}$ first field is used to indicate an identifier of a radio bearer, and the $n^{th}$ second field is used to indicate buffer latency information of one or more data packets carried on the radio bearer indicated by the $n^{th}$ first field.

In other words, one first MAC CE may include one or more pieces of buffer latency information, and a granularity of the buffer latency information may be one of the logical channel, the logical channel group, the network slice, or the radio bearer. In other words, the measurement object may be one of the logical channel, the logical channel group, the network slice, or the radio bearer. The one or more pieces of buffer latency information included in the first MAC CE are in a one-to-one correspondence with identifiers of one or more measurement objects.

FIG. 6 to FIG. 10 each are a schematic diagram of a first MAC CE according to an embodiment of this application.

As shown in the figure, the first MAC CEs shown in FIG. 6 to FIG. 9 each may include N first fields and N second fields. The first field is used to indicate the identifier of the measurement object of the buffer latency information, and the second field is used to indicate the buffer latency information.

Figure 6:
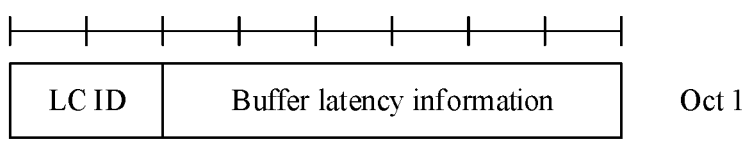
FIG. 6 to FIG. 14 each are a schematic diagram of a MAC CE according to an embodiment of this application.

Specifically, the first MAC CE in FIG. 6 carries one piece of buffer latency information, and a reporting granularity of the buffer latency information is a logical channel. A measurement object of the buffer latency information carried in the first MAC CE is a logical channel, the first field is used to indicate an identifier of the measured logical channel, and the second field is used to indicate the buffer latency information of the logical channel.

Figure 7:
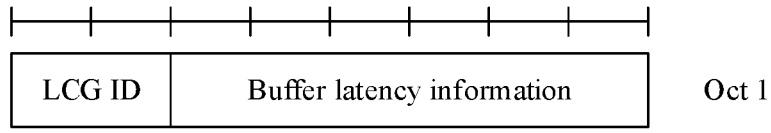

The first MAC CE in FIG. 7 carries one piece of buffer latency information, and a reporting granularity of the buffer latency information is a logical channel group. A measurement object of the buffer latency information carried in the first MAC CE is a logical channel group, the first field is used to indicate an identifier of the measured logical channel group, and the second field is used to indicate buffer latency information of the logical channel group.

Figure 8:
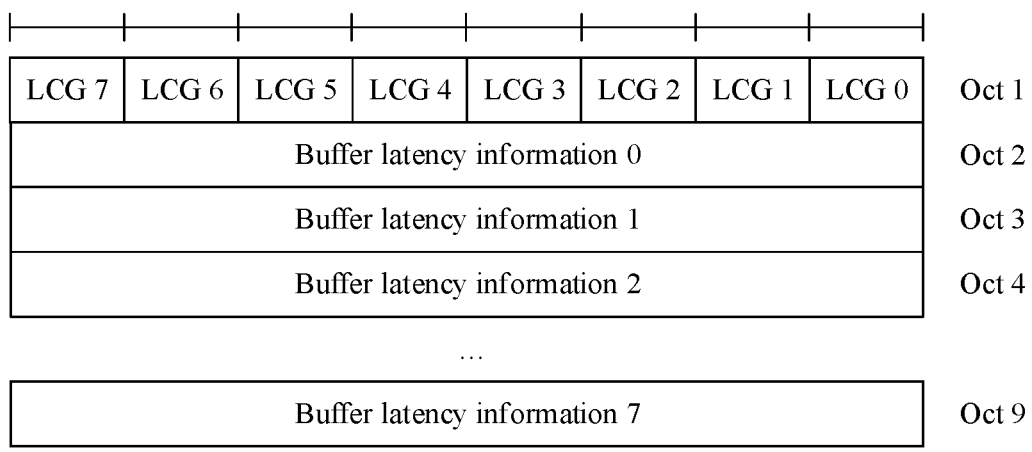

The first MAC CE in FIG. 8 carries a plurality of pieces of buffer latency information, and a reporting granularity of each piece of buffer latency information is a logical channel group. A measurement object of the buffer latency information carried in the first MAC CE is a logical channel group, the first field is used to indicate an identifier of a logical channel group corresponding to each piece of buffer latency information, and the second field is used to indicate buffer latency information corresponding to each logical channel group.

Figure 9:
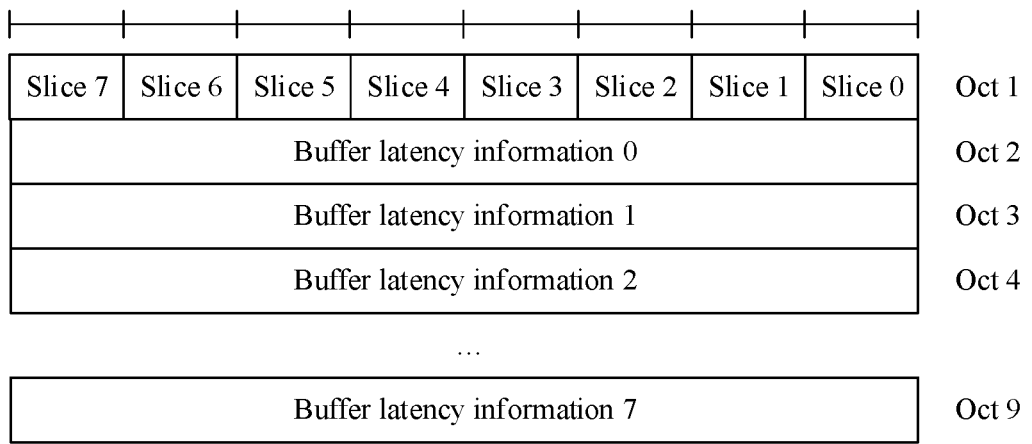

The first MAC CE in FIG. 9 carries a plurality of pieces of buffer latency information, and a reporting granularity of each piece of buffer latency information is a network slice. A measurement object of the buffer latency information carried in the first MAC CE is a logical channel, the first field is used to indicate an identifier of a network slice corresponding to each piece of buffer latency information, and the second field is used to indicate buffer latency information corresponding to each network slice.

As described above, the foregoing buffer latency information carried in the first MAC CE may be a buffer latency of one or more data packets, or may be an average value, a maximum value, a minimum value, or an accumulated value of buffer latencies of a plurality of data packets.

When N is greater than 1, the first MAC CE includes a plurality of first fields and a plurality of second fields, and a format of the first MAC CE may be predefined, for example, defined in a protocol. The format of the first MAC CE may be represented as an arrangement sequence of the N first fields and the N second fields and bit overheads occupied by each of the N first fields and the N second fields.

In an implementation, the N first fields and the N second fields may be separately arranged in the first MAC CE. The N first fields occupy $B_1*N$ consecutive bits, where $B_1$ indicates a quantity of bits occupied by each first field. The N second fields occupy $B_2*N$ consecutive bits, where $B_2$ indicates a quantity of bits occupied by each second field. As shown in FIG. 8, eight first fields occupy 8 consecutive bits, each first field occupies 1 bit, eight second fields occupy 8 consecutive bytes, and each second field occupies 1 byte, that is, 8 bits.

In another implementation, one first field and one second field may be used as one group in the first MAC CE, and occupy B1+B2 consecutive bits. The first MAC CE may occupy (B1+B2)*N bits in total. The first field and the second field in each group corresponds to each other. To be specific, each second field is used to indicate buffer latency information of a measurement object indicated by a first field in a same group.

In addition, when the first MAC CE carries a plurality of pieces of buffer latency information, the terminal device may map, one by one according to a predefined rule, identifiers of a plurality of measurement objects and the plurality of pieces of buffer latency information to a plurality of first fields and a plurality of second fields. For example, the terminal device may sequentially map the corresponding buffer latency information to the plurality of second fields based on a sequence of the identifiers, of the measurement objects, indicated in the plurality of first fields. As shown in FIG. 8, the first MAC CE corresponds to eight logical channel groups whose logical channel group identifiers range from 0 to 7, and the terminal device sequentially places, in a sequence of the logical channel group identifiers LCG 7 to LCG 0, the logical channel group identifiers into the eight first fields from left to right. The terminal device may further map, in a placement sequence of the logical channel group identifiers, eight pieces of buffer latency information that are in a one-to-one correspondence with the logical channel group identifiers LCG 7 to LCG 0, to the eight second fields arranged from top to bottom.

For another example, when the first MAC CE is designed by using one first field and one second field as a group, the terminal device may sequentially map, in an ascending order of the identifiers of the measurement objects, eight groups each including one identifier of one measurement object and corresponding buffer latency information to eight groups that each includes one first field and one second field and that are arranged from top to bottom.

It should be understood that, only for ease of understanding herein, the examples are used to describe a possible mapping rule for mapping the identifiers of the plurality of measurement objects and the plurality of pieces of buffer latency information to the plurality of first fields and the plurality of second fields. However, this shall not constitute any limitation on this application. This is not limited in this application.

In this design, the first MAC CE may be a newly added MAC CE, and carries only information related to the buffer latency information. The buffer latency information carried in the first MAC CE may be determined based on any one of the foregoing listed data packet types, or may be determined based on any one of the foregoing listed reporting granularities, or may be determined based on any one of the foregoing listed data packet types and any one of the foregoing listed reporting granularities. This is not limited in this application.

In addition, the buffer latency information carried in the first MAC CE may be determined based on a buffer latency of one or more data packets, and the buffer latency may be a time interval between a time point at which a data packet arrives at an AS and a time point at which a corresponding BSR is sent, or may be a time interval between a time point at which a data packet arrives at an AS and a time point at which a corresponding uplink grant is received.

If the buffer latency is used to indicate the time interval between the time point at which the data packet arrives at the AS and the time point at which the corresponding BSR is sent, because the BSR is sent by using a physical uplink resource scheduled by the access network device for the terminal device, and a time-domain position of the physical uplink resource may be learned of in advance by using an uplink grant of the physical uplink resource, the terminal device may know, in advance, a time point at which the BSR is sent. Therefore, the first MAC CE may be sent before the BSR is sent, or may be sent after the BSR is sent. This is not limited in this application.

If the buffer latency is used to indicate the time interval between the time point at which the data packet arrives at the AS and the time point at which the corresponding uplink grant is received, because the uplink grant is sent by the access network device to the terminal device, and the terminal device may not predict, in advance, the time point at which the uplink grant is received, the first MAC CE may be sent after the uplink grant is received.

Figure 10:
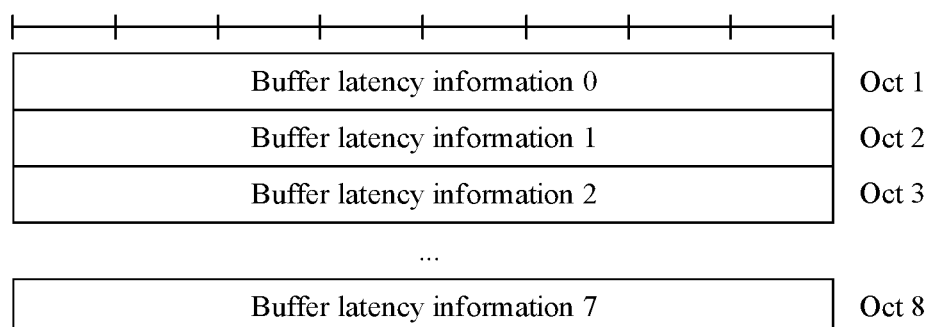

In this design, the first MAC CE may be further simplified to including only N second fields, and the N second fields are respectively used to indicate N pieces of buffer latency information. It may be understood that the N second fields may be in a one-to-one correspondence with N measurement objects. When N is greater than 1, a rule for mapping to the N second fields in the first MAC CE may be predefined. For example, the N pieces of buffer latency information may be sequentially mapped to the N second fields in an ascending order of the identifiers of the measurement objects, as shown in FIG. 10. A first MAC CE shown in FIG. 10 includes only N second fields. Measurement objects of N pieces of buffer latency information indicated by the N second fields may be data packets, logical channels, logical channel groups, network slices, or radio bearers. The access network device may indicate the N measurement objects to the terminal device in advance. In this way, the terminal device and the access network device may respectively report and collect statistics about the buffer latency information based on the same N measurement objects and the pre-defined mapping rule.

In another possible design, the first MAC CE includes a first field, a second field corresponding to the first field, and a third field corresponding to the first field. The first field is used to indicate the identifier of the measurement object, the second field is used to indicate the buffer latency information of the measurement object, and the third field is used to indicate a buffer size of the measurement object.

Optionally, the first MAC CE includes N first fields, N second fields, and N third fields, the N first fields are in a one-to-one correspondence with the N second fields, the N first fields are in a one-to-one correspondence with the N third fields, and N is an integer greater than or equal to 1.

An $n^{th}$ first field is used to indicate an identifier of a measurement object, an $n^{th}$ second field is used to indicate buffer latency information of the measurement object indicated by the $n^{th}$ first field, and an $n^{th}$ third field is used to indicate a size of the measurement object indicated by the $n^{th}$ first field, where $1 \leq n \leq N$, and n is an integer.

Specifically, the $n^{th}$ first field is used to indicate an identifier of a logical channel, the $n^{th}$ second field is used to indicate buffer latency information of one or more data packets carried on the logical channel indicated by the $n^{th}$ first field, and the $n^{th}$ third field is used to indicate a size of the data packets carried on the logical channel indicated by the $n^{th}$ first field;

the $n^{th}$ first field is used to indicate an identifier of a logical channel group, the $n^{th}$ second field is used to indicate buffer latency information of one or more data packets carried on one or more logical channels in the logical channel group, and the $n^{th}$ third field is used to indicate a size of the data packets carried on the logical channels in the logical channel group indicated by the $n^{th}$ first field;

the $n^{th}$ first field is used to indicate an identifier of a network slice, the $n^{th}$ second field is used to indicate buffer latency information of one or more data packets transmitted on the network slice indicated by the $n^{th}$ first field, and the third field is used to indicate a size of the data packets transmitted on the network slice indicated by the first field; or the $n^{th}$ first field is used to indicate an identifier of a radio bearer, the $n^{th}$ second field is used to indicate buffer latency information of one or more data packets carried on the radio bearer indicated by the $n^{th}$ first field, and the $n^{th}$ third field is used to indicate a size of the data packets carried on the radio bearer indicated by the $n^{th}$ first field.

In other words, one first MAC CE may include one or more pieces of buffer latency information and one or more buffer sizes. The granularity of the buffer latency information may be one of the logical channel, the logical channel group, the network slice, or the radio bearer, that is, the measurement object may be one of the logical channel, the logical channel group, the network slice, or the radio bearer. The one or more pieces of buffer latency information included in the first MAC CE are in a one-to-one correspondence with identifiers of one or more measurement objects, and the one or more buffer sizes included in the first MAC CE are in a one-to-one correspondence with the identifiers of the one or more measurement objects.

FIG. 11 to FIG. 14 each are a schematic diagram of a first MAC CE according to an embodiment of this application.

Figure 11:
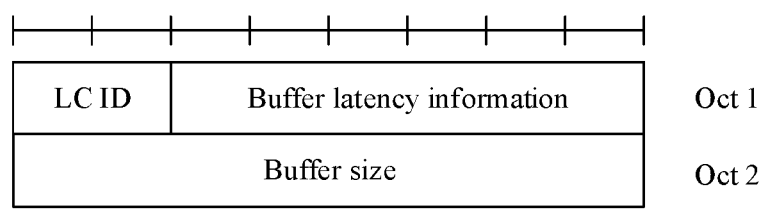
Figure 12:
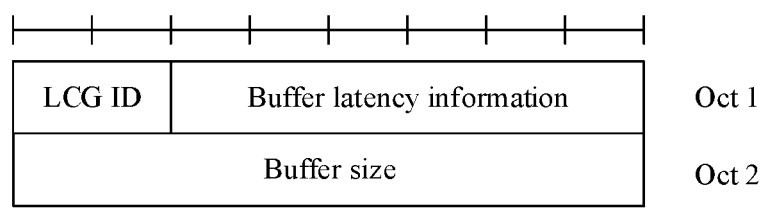
Figure 13:
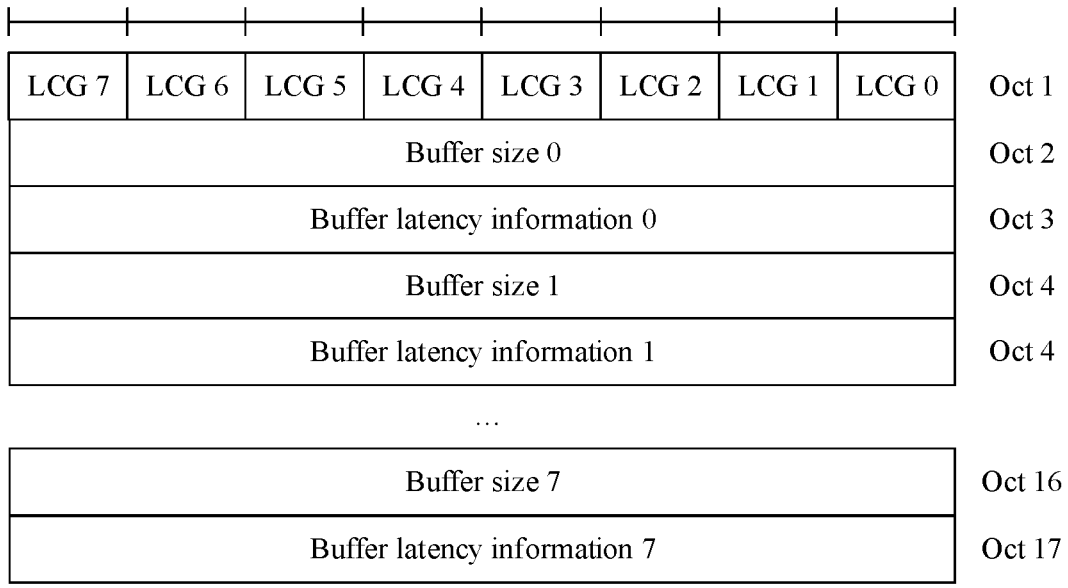

As shown in the figure, the first MAC CEs shown in FIG. 11 to FIG. 13 each may include N first fields, N second fields, and N third fields. The first field is used to indicate an identifier of a measurement object of buffer latency information, the second field is used to indicate the buffer latency information, and the third field is used to indicate a buffer size.

Specifically, the first MAC CE in FIG. 11 carries one piece of buffer latency information and one buffer size, and a reporting granularity of the buffer latency information is a logical channel. A measurement object of the buffer latency information carried in the first MAC CE is a logical channel, and the first field is used to indicate an identifier of the measured logical channel.

The first MAC CE in FIG. 12 carries one piece of buffer latency information and one buffer size, and a reporting granularity of the buffer latency information is a logical channel group. A measurement object of the buffer latency information carried in the first MAC CE is a logical channel, and the first field is used to indicate an identifier of the measured logical channel group.

Optionally, the first MAC CE is a BSR MAC CE.

The first MAC CE shown in FIG. 12 may be a MAC CE obtained after a field of an existing BSR MAC CE is extended. Compared with the first MAC CE shown in FIG. 3, the first MAC CE shown in FIG. 12 has an additional field used to indicate the buffer latency information.

The first MAC CE in FIG. 13 carries a plurality of pieces of buffer latency information and a plurality of buffer sizes, and a reporting granularity of each piece of buffer latency information is a logical channel group. A measurement object of the buffer latency information carried in the first MAC CE is a logical channel group, and the first field is used to indicate an identifier of the logical channel group corresponding to each piece of buffer latency information.

As described above, the foregoing buffer latency information carried in the first MAC CE may be a buffer latency of one or more data packets, or may be an average value, a maximum value, a minimum value, or an accumulated value of buffer latencies of a plurality of data packets. The buffer size carried in the first MAC CE may be determined based on the prior art. For brevity, detailed descriptions of the specific process are omitted herein.

In an implementation, the N first fields may be separated from the N second fields and the N third fields in the first MAC CE, and the N first fields occupy $B_1 * N$ consecutive bits, $B_1$ indicates a quantity of bits occupied by each first field. The N second fields may also be separated from the N third fields. The N second fields occupy $B_2 * N$ consecutive bits, and the N third fields occupy $B_3 * N$ consecutive bits, where $B_2$ indicates a quantity of bits occupied by each second field, and $B_3$ indicates a quantity of bits occupied by each third field. Alternatively, one second field and one third field may be used as one group, and occupy $B_2 + B_3$ consecutive bits. The N second fields and the N third fields may occupy $(B_2+B_3) * N$ consecutive bits in total. As shown in FIG. 13, eight first fields occupy 8 consecutive bits, each first field occupies 1 bit, eight second fields and eight third fields may be used as eight groups, and occupy 16 consecutive bytes, each group occupies 2 bytes, each second field occupies 1 byte, and each third field occupies 1 byte.

It should be understood that a plurality of possible formats of the first MAC CE are listed above with reference to FIG. 11 to FIG. 13, but shall not constitute any limitation on this application. For example, a sequence of the second field and the third field may be adjusted. For another example, one first field, one second field, and one third field may be used as one group, and occupy B1+B2+B3 consecutive bits. A specific design of the format of the first MAC CE is not limited in this application. The terminal device and the access network device may respectively generate and parse the first MAC CE based on a predefined format.

In addition, when the first MAC CE carries a plurality of pieces of buffer latency information and a plurality of buffer sizes, the terminal device may map, one by one according to a predefined rule, identifiers of a plurality of measurement objects, a plurality of buffer latencies, and the plurality of buffer sizes to a plurality of first fields, a plurality of second fields, and a plurality of third fields. As shown in FIG. 13, the first MAC CE corresponds to eight logical channel groups whose logical channel group identifiers range from 0 to 7, and the terminal device sequentially places, in a sequence of the logical channel group identifiers LCG 7 to LCG 0, the logical channel group identifiers into the eight first fields from left to right. The terminal device may further map, in a placement sequence of the logical channel group identifiers, eight groups that each includes one buffer size and one piece of buffer latency information and that are in a one-to-one correspondence with the logical channel group identifiers LCG 7 to LCG 0, to eight groups that each includes one third field and one second field and that are arranged from top to bottom.

It should be understood that, only for ease of understanding herein, the examples are used to describe a possible mapping rule for mapping the identifiers of the plurality of measurement objects and the plurality of pieces of buffer latency information to the plurality of first fields and the plurality of second fields. However, this shall not constitute any limitation on this application. This is not limited in this application.

In this design, the first MAC CE may be a newly added MAC CE, or may be a MAC CE obtained after a field of an existing MAC CE is extended. The buffer latency information carried in the first MAC CE may be determined based on any one of the foregoing listed data packet types, or may be determined based on any one of the foregoing listed reporting granularities, or may be determined based on any one of the foregoing listed data packet types and any one of the foregoing listed reporting granularities. This is not limited in this application.

In addition, the buffer latency information carried in the first MAC CE may be determined based on a buffer latency of one or more data packets, and the buffer latency may be a time interval between a time point at which a data packet arrives at an AS and a time point at which a corresponding BSR is sent, or may be a time interval between a time point at which a data packet arrives at an AS and a time point at which a corresponding uplink grant is received.

If the first MAC CE is a newly added MAC CE, the buffer latency may be used to indicate the time interval between the time point at which the data packet arrives at the AS and the time point at which the corresponding BSR is sent, or may be used to indicate the time interval between the time point at which the data packet arrives at the AS and the time point at which the corresponding uplink grant is received. Therefore, the first MAC CE may be sent before the BSR is sent, or may be sent after the BSR is sent.

If the first MAC CE is an extension to an existing MAC CE, for example, a BSR MAC CE, the buffer latency may be used to indicate the time interval between the time point at which the data packet arrives at the AS and the time point at which the corresponding BSR is sent. Because before sending the BSR, the terminal device may not learn of an arrival time point of the uplink grant scheduled for the data packet, the first MAC CE may be sent after the BSR is sent.

Figure 14:
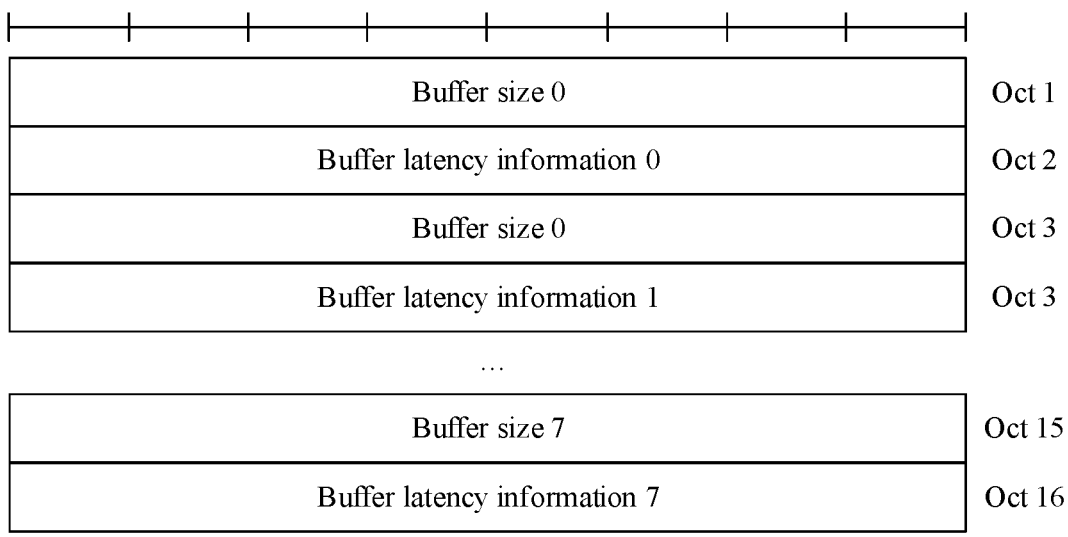

In this design, the first MAC CE may alternatively be further simplified to include only N second fields and N third fields. The N second fields are respectively used to indicate N pieces of buffer latency information, and the N third fields are respectively used to indicate N buffer sizes. It may be understood that the N second fields may be in a one-to-one correspondence with N measurement objects, and the N third fields may also be in a one-to-one correspondence with the N measurement objects. When N is greater than 1, a rule for mapping to the N second fields and the N third fields in the first MAC CE may be predefined. For example, as shown in FIG. 14, the N second fields and the N third fields may be alternately arranged from top to bottom in an ascending order of identifiers of the measurement objects. Alternatively, the N second fields may be placed before the N third fields in an ascending order of the identifiers of the measurement objects. This is not limited in this application.

The first MAC CE shown in FIG. 14 includes only N second fields and N third fields. Measurement objects of N pieces of buffer latency information indicated by the N second fields may be the same as measurement objects of N buffer sizes indicated by the N third fields. For example, the measurement objects may be data packets, logical channels, logical channel groups, network slices, or radio bearers. The access network device may indicate the N measurement objects to the terminal device in advance. In this way, the terminal device and the access network device may respectively report and collect statistics about the buffer latency information based on the N measurement objects and the pre-defined mapping rule.

Optionally, the first MAC CE shown in FIG. 14 is a BSR MAC CE.

The first MAC CE shown in FIG. 14 may alternatively be a MAC CE obtained after a field of an existing BSR MAC CE is extended. Compared with the first MAC CE shown in FIG. 4, the first MAC CE shown in FIG. 14 has an additional field used to indicate the buffer latency information.

It should be understood that a plurality of possible formats of the first MAC CE are listed above with reference to FIG. 6 to FIG. 14. However, this shall not constitute any limitation on this application. A specific design of the format of the first MAC CE is not limited in this application. The terminal device and the access network device may respectively generate and parse the first MAC CE based on a predefined format.

As described above, the buffer latency information may be a buffer latency of one or more data packets, or may be a maximum value, a minimum value, an average value, or an accumulated value of buffer latencies of a plurality of data packets. Therefore, the buffer latency information is essentially a latency value. In this embodiment of this application, the terminal device may report an absolute value of the buffer latency information to the access network device, or may report an index of the buffer latency information to the access network device.

To reduce bit overheads, the terminal device and the access network device may predefine an index of a latency value, to be specific, may define a unique index for a latency value in any interval. For example, Table 1 and Table 2 show a one-to-one correspondence between a plurality of latency values and a plurality of indexes. Specifically, Table 1 shows a case in which the latency value is indicated by using 5 bits, and index numbers may be 0 to 31. Table 2 shows a case in which the latency value is indicated by using 8 bits, and index numbers may be 0 to 255.

TABLE 1

| Index | Latency value (millisecond) |
|---|---|
| 0 | 0 |
| 1 | ≤10 |
| 2 | ≤14 |
| 3 | ≤20 |
| 4 | ≤28 |
| 5 | ≤38 |
| 6 | ≤53 |
| 7 | ≤74 |
| 8 | ≤102 |
| 9 | ≤142 |
| 10 | ≤198 |
| 11 | ≤276 |
| 12 | ≤384 |
| 13 | ≤535 |

TABLE 1-continued

| Index | Latency value (millisecond) |
|---|---|
| 14 | ≤745 |
| 15 | ≤1038 |
| 16 | ≤1446 |
| 17 | ≤2014 |
| 18 | ≤2806 |
| 19 | ≤3909 |
| 20 | ≤5446 |
| 21 | ≤7587 |
| 22 | ≤10570 |
| 23 | ≤14726 |
| 24 | ≤20516 |
| 25 | ≤28581 |
| 26 | ≤39818 |
| 27 | ≤55474 |
| 28 | ≤77284 |
| 29 | ≤107669 |
| 30 | ≤150000 |
| 31 | >150000 |

TABLE 2

| Index | Latency value (millisecond) |
|---|---|
| 0 | 0 |
| 1 | ≤10 |
| 2 | ≤11 |
| 3 | ≤12 |
| 4 | ≤13 |
| 5 | ≤13 |
| 6 | ≤14 |
| 7 | ≤15 |
| 8 | ≤16 |
| 9 | ≤17 |
| 10 | ≤18 |
| 11 | ≤19 |
| 12 | ≤20 |
| 13 | ≤22 |
| 14 | ≤23 |
| 15 | ≤25 |
| 16 | ≤26 |
| 17 | ≤28 |
| 18 | ≤30 |
| 19 | ≤32 |
| 20 | ≤34 |
| 21 | ≤36 |
| 22 | ≤38 |
| 23 | ≤40 |
| 24 | ≤43 |
| 25 | ≤46 |
| 26 | ≤49 |
| 27 | ≤52 |
| 28 | ≤55 |
| 29 | ≤59 |
| 30 | ≤62 |
| 31 | ≤66 |
| 32 | ≤71 |
| 33 | ≤75 |
| 34 | ≤80 |
| 35 | ≤85 |
| 36 | ≤91 |
| 37 | ≤97 |
| 38 | ≤103 |
| 39 | ≤110 |
| 40 | ≤117 |
| 41 | ≤124 |
| 42 | ≤132 |
| 43 | ≤141 |
| 44 | ≤150 |
| 45 | ≤160 |
| 46 | ≤170 |
| 47 | ≤181 |
| 48 | ≤193 |
| 49 | ≤205 |
| 50 | ≤218 |
| 51 | ≤233 |

TABLE 2-continued

| Index | Latency value (millisecond) |
|---|---|
| 52 | ≤248 |
| 53 | ≤264 |
| 54 | ≤281 |
| 55 | ≤299 |
| 56 | ≤318 |
| 57 | ≤339 |
| 58 | ≤361 |
| 59 | ≤384 |
| 60 | ≤409 |
| 61 | ≤436 |
| 62 | ≤464 |
| 63 | ≤494 |
| 64 | ≤526 |
| 65 | ≤560 |
| 66 | ≤597 |
| 67 | ≤635 |
| 68 | ≤677 |
| 69 | ≤720 |
| 70 | ≤767 |
| 71 | ≤817 |
| 72 | ≤870 |
| 73 | ≤926 |
| 74 | ≤987 |
| 75 | ≤1051 |
| 76 | ≤1119 |
| 77 | ≤1191 |
| 78 | ≤1269 |
| 79 | ≤1351 |
| 80 | ≤1439 |
| 81 | ≤1532 |
| 82 | ≤1631 |
| 83 | ≤1737 |
| 84 | ≤1850 |
| 85 | ≤1970 |
| 86 | ≤2098 |
| 87 | ≤2234 |
| 88 | ≤2379 |
| 89 | ≤2533 |
| 90 | ≤2698 |
| 91 | ≤2873 |
| 92 | ≤3059 |
| 93 | ≤3258 |
| 94 | ≤3469 |
| 95 | ≤3694 |
| 96 | ≤3934 |
| 97 | ≤4189 |
| 98 | ≤4461 |
| 99 | ≤4751 |
| 100 | ≤5059 |
| 101 | ≤5387 |
| 102 | ≤5737 |
| 103 | ≤6109 |
| 104 | ≤6506 |
| 105 | ≤6928 |
| 106 | ≤7378 |
| 107 | ≤7857 |
| 108 | ≤8367 |
| 109 | ≤8910 |
| 110 | ≤9488 |
| 111 | ≤10104 |
| 112 | ≤10760 |
| 113 | ≤11458 |
| 114 | ≤12202 |
| 115 | ≤12994 |
| 116 | ≤13838 |
| 117 | ≤14736 |
| 118 | ≤15692 |
| 119 | ≤16711 |
| 120 | ≤17795 |
| 121 | ≤18951 |
| 122 | ≤20181 |
| 123 | ≤21491 |
| 124 | ≤22885 |
| 125 | ≤24371 |
| 126 | ≤25953 |
| 127 | ≤27638 |
| 128 | ≤29431 |
| 129 | ≤31342 |

TABLE 2-continued

| Index | Latency value (millisecond) |
|---|---|
| 130 | ≤33376 |
| 131 | ≤35543 |
| 132 | ≤37850 |
| 133 | ≤40307 |
| 134 | ≤42923 |
| 135 | ≤45709 |
| 136 | ≤48676 |
| 137 | ≤51836 |
| 138 | ≤55200 |
| 139 | ≤58784 |
| 140 | ≤62599 |
| 141 | ≤66663 |
| 142 | ≤70990 |
| 143 | ≤75598 |
| 144 | ≤80505 |
| 145 | ≤85730 |
| 146 | ≤91295 |
| 147 | ≤97221 |
| 148 | ≤103532 |
| 149 | ≤110252 |
| 150 | ≤117409 |
| 151 | ≤125030 |
| 152 | ≤133146 |
| 153 | ≤141789 |
| 154 | ≤150992 |
| 155 | ≤160793 |
| 156 | ≤171231 |
| 157 | ≤182345 |
| 158 | ≤194182 |
| 159 | ≤206786 |
| 160 | ≤220209 |
| 161 | ≤234503 |
| 162 | ≤249725 |
| 163 | ≤265935 |
| 164 | ≤283197 |
| 165 | ≤301579 |
| 166 | ≤321155 |
| 167 | ≤342002 |
| 168 | ≤364202 |
| 169 | ≤387842 |
| 170 | ≤413018 |
| 171 | ≤439827 |
| 172 | ≤468377 |
| 173 | ≤498780 |
| 174 | ≤531156 |
| 175 | ≤565634 |
| 176 | ≤602350 |
| 177 | ≤641449 |
| 178 | ≤683087 |
| 179 | ≤727427 |
| 180 | ≤774645 |
| 181 | ≤824928 |
| 182 | ≤878475 |
| 183 | ≤935498 |
| 184 | ≤996222 |
| 185 | ≤1060888 |
| 186 | ≤1129752 |
| 187 | ≤1203085 |
| 188 | ≤1281179 |
| 189 | ≤1364342 |
| 190 | ≤1452903 |
| 191 | ≤1547213 |
| 192 | ≤1647644 |
| 193 | ≤1754595 |
| 194 | ≤1868488 |
| 195 | ≤1989774 |
| 196 | ≤2118933 |
| 197 | ≤2256475 |
| 198 | ≤2402946 |
| 199 | ≤2558924 |
| 200 | ≤2725027 |
| 201 | ≤2901912 |
| 202 | ≤3090279 |
| 203 | ≤3290873 |
| 204 | ≤3504487 |
| 205 | ≤3731968 |
| 206 | ≤3974215 |
| 207 | ≤4232186 |
| 208 | ≤4506902 |
| 209 | ≤4799451 |
| 210 | ≤5110989 |
| 211 | ≤5442750 |
| 212 | ≤5796046 |
| 213 | ≤6172275 |
| 214 | ≤6572925 |
| 215 | ≤6999582 |
| 216 | ≤7453933 |
| 217 | ≤7937777 |
| 218 | ≤8453028 |
| 219 | ≤9001725 |
| 220 | ≤9586039 |
| 221 | ≤10208280 |
| 222 | ≤10870913 |
| 223 | ≤11576557 |
| 224 | ≤12328006 |
| 225 | ≤13128233 |
| 226 | ≤13980403 |
| 227 | ≤14887889 |
| 228 | ≤15854280 |
| 229 | ≤16883401 |
| 230 | ≤17979324 |
| 231 | ≤19146385 |
| 232 | ≤20389201 |
| 233 | ≤21712690 |
| 234 | ≤23122088 |
| 235 | ≤24622972 |
| 236 | ≤26221280 |
| 237 | ≤27923336 |
| 238 | ≤29735875 |
| 239 | ≤31666069 |
| 240 | ≤33721553 |
| 241 | ≤35910462 |
| 242 | ≤38241455 |
| 243 | ≤40723756 |
| 244 | ≤43367187 |
| 245 | ≤46182206 |
| 246 | ≤49179951 |
| 247 | ≤52372284 |
| 248 | ≤55771835 |
| 249 | ≤59392055 |
| 250 | ≤63247269 |
| 251 | ≤67352729 |
| 252 | ≤71724679 |
| 253 | ≤76380419 |
| 254 | ≤81338368 |
| 255 | >81338368 |

It should be understood that Table 1 and Table 2 show only two examples of the correspondence between a latency value and an index, and should not constitute any limitation on this application. The correspondence between a latency value and an index may be predefined, for example, may be defined in a protocol, or may be notified by the access network device to the terminal device in advance by using signaling. This is not limited in this application. It can be learned that a larger quantity of bits of the index indicates a finer division granularity of the latency value that can be indicated. Alternatively, a larger quantity of bits of the index indicates a larger range of the latency value. However, the cost is an increase of bit overheads. Therefore, a tradeoff may be made between the bit overheads of the index and the range and division granularity of the latency value, to determine a proper correspondence between a latency value and an index.

Optionally, step 240 specifically includes:

The terminal device sends a first RRC message, where the first RRC message carries the buffer latency information.

Correspondingly, the access network device receives the first RRC message, where the first RRC message carries the buffer latency information.

Specifically, the first RRC message may be a new RRC message added by the terminal device, in other words, an independent RRC message, and the first RRC message carries the buffer latency information. Alternatively, the first RRC message may be an RRC message generated by the terminal device by extending a field of an existing RRC message. This is not limited in this application.

In this embodiment of this application, the MAC layer may determine the buffer latency information based on the specific process of determining the buffer latency information described above, and may notify the RRC layer of the buffer latency information by using an inter-layer primitive, so that the RRC layer generates the first RRC message carrying the buffer latency information.

Based on the foregoing technical solution, the buffer latency of the data packet is defined, to quantize a waiting time period between the time point at which the data packet arrives at the AS and the time point at which a resource scheduling request is sent, or quantize a waiting time period between the time point at which the data packet arrives at the AS and the time point at which the uplink grant is received, so that the terminal device reports the buffer latency to the access network device. The terminal device reports, to the access network device, the buffer latency information determined based on the buffer latency of the one or more data packets, so that the access network device can more accurately learn of an end to end latency. This helps the access network device make a proper resource scheduling policy, to reduce a buffer latency, so as to reduce the end to end latency, increase a latency gain, and improve user experience.

In addition, the terminal device may report buffer latency information of different types of data packets to the access network device based on different reporting granularities, so that the access network device can make a proper resource scheduling policy based on the buffer latency information, to reduce the buffer latency. This helps reduce the end-to-end latency, increase the latency gain, and improve user experience.

This application further provides a communication method, to report a jitter level based on buffer latencies of a plurality of data packets.

Figure 15:
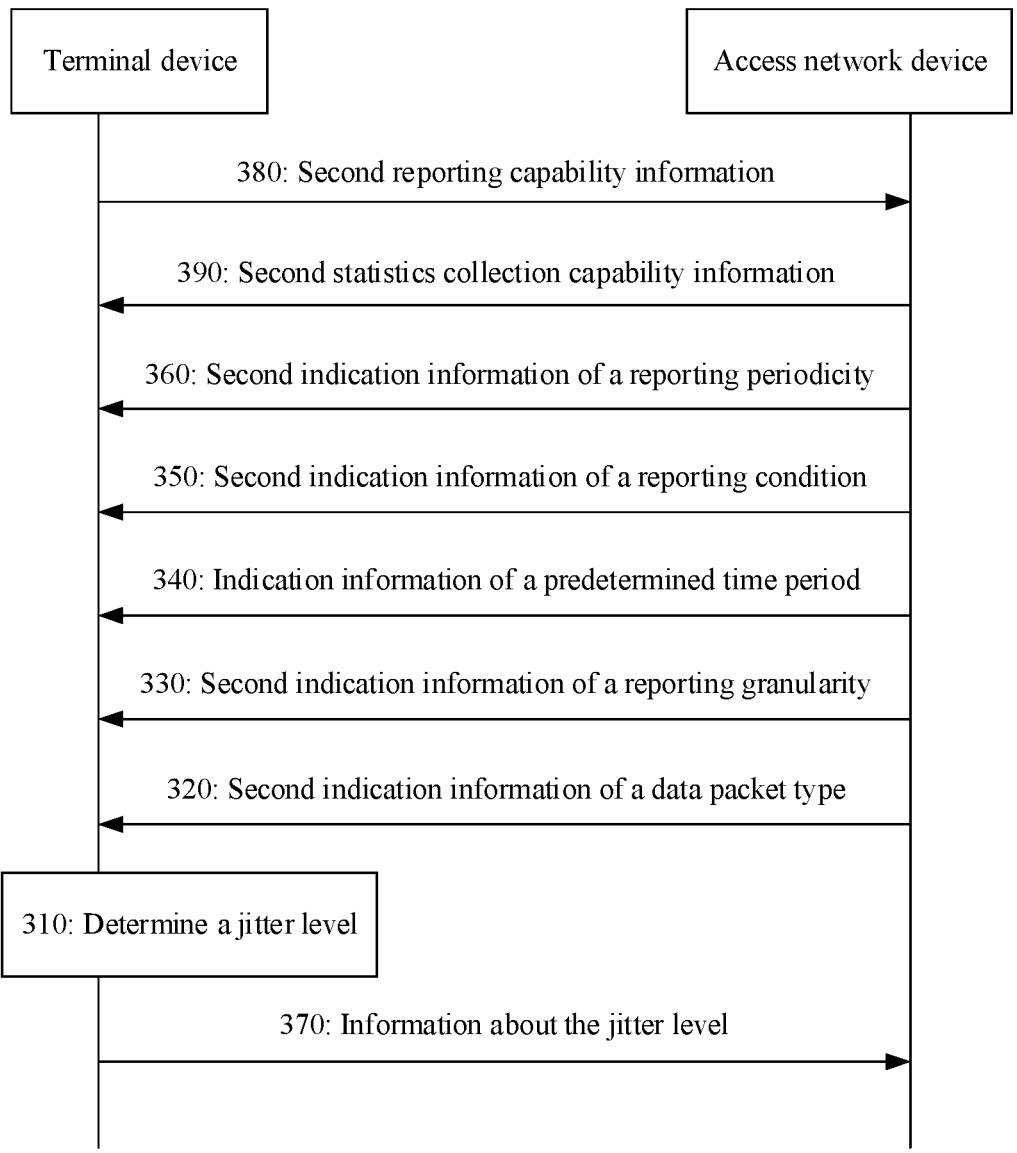
FIG. 15 is a schematic flowchart of a communication method according to another embodiment of this application.

FIG. 15 is a schematic flowchart of a communication method 300 from a perspective of device interaction according to another embodiment of this application. As shown in the figure, the method 300 shown in FIG. 15 may include step 310 to step 390. The following describes the communication method in detail with reference to the accompanying drawings.

In step 310, a terminal device determines a jitter level, where the jitter level is determined based on buffer latencies of a plurality of data packets. Specifically, the jitter level may be used to indicate a difference between latency levels of different data packets.

Optionally, the jitter level is determined based on the buffer latencies that are of the plurality of data packets and that are determined based on a data packet type.

The buffer latency indicates a time interval between a time point at which a data packet arrives at an access stratum AS and a time point at which a corresponding BSR is sent, or the buffer latency indicates a time interval between a time point at which a data packet arrives at an AS and a time point at which a corresponding uplink grant is received. Specific content of the buffer latency is described in detail in the foregoing method 200. For brevity, details are not described herein again.

As an example instead of a limitation, the data packet type may include, for example, an SDAP SDU, an SDAP PDU, a PDCP PDU, an RLC PDU, or a MAC PDU.

The data packet type may be predefined, for example, defined in a protocol, or may be indicated by an access network device in advance.

Optionally, step 310 specifically includes: The terminal device determines the jitter level based on the data packet type and the buffer latencies of a plurality of data packets corresponding to the data packet type.

Optionally, the method 300 further includes step 320: The terminal device receives second indication information of the data packet type.

Correspondingly, in step 320, the access network device sends the second indication information of the data packet type.

In this embodiment of this application, the data packet type corresponding to information about the jitter level may be the same as or different from the data packet type corresponding to the buffer latency information in the foregoing method 200.

It should be understood that the data packet type is described in detail in the foregoing method 200, and a specific process of step 320 is similar to step 220 in the foregoing method 200. Because the data packet type and step 220 are described in detail above, for brevity, details are not described herein again.

Optionally, step 310 specifically includes: The terminal device determines the jitter level based on a reporting granularity, where the jitter level is determined based on buffer latencies of a plurality of data packets corresponding to the reporting granularity in a buffer time period.

The reporting granularity may be a logical channel or a logical channel group, or may be a network slice or a radio bearer.

Specifically, the jitter level may be determined based on buffer latencies of a plurality of data packets transmitted on a same logical channel in a predetermined time period, may be determined based on buffer latencies of a plurality of data packets transmitted on a same logical channel group in a predetermined time period, may be determined based on buffer latencies of a plurality of data packets transmitted on a same network slice in a predetermined time period, or may be determined based on buffer latencies of a plurality of data packets transmitted on a same radio bearer in a predetermined time period.

Because in one time period, data packets on a same logical channel, a same logical channel group, a same network slice, or a same radio bearer may be a plurality of data packets obtained by segmenting one data packet from an upper layer, sequence numbers of the data packets are consecutive. Consequently, when a difference between the latencies of the plurality of data packets received by a receive end device of the data is relatively large, relatively large jitter may be caused. Therefore, the latencies of the plurality of data packets with consecutive sequence numbers on the same logical channel or logical channel group are controlled, to control latency values of the plurality of data packets to be close to a latency value. In this way, the difference between the latencies of the plurality of data packets with consecutive sequence numbers can be reduced. This helps reduce a jitter and improve user experience.

The reporting granularity may be predefined, for example, defined in a protocol, or may be indicated by the access network device in advance.

Optionally, the method 300 further includes step 330: The terminal device receives second indication information of the reporting granularity.

Correspondingly, in step 330, the access network device sends the second indication information of the reporting granularity.

In this embodiment of this application, the reporting granularity of the information about the jitter level may be the same as or different from the reporting granularity of the buffer latency information in the foregoing method 200.

It should be understood that the reporting granularity is described in detail in the foregoing method 200, and a specific process of step 330 is similar to step 230 in the foregoing method 200. Because the reporting granularity and step 230 are described in detail above, for brevity, details are not described herein again.

The predetermined time period may be predefined, for example, defined in a protocol, or may be indicated by the access network device in advance.

Optionally, the method 300 further includes step 340: The terminal device receives indication information of the predetermined time period.

Correspondingly, in step 340, the access network device sends the indication information of the predetermined time period.

The indication information of the preset time period may include a start time point and a time period length. It should be understood that defining the predetermined time period in the protocol or indicating the predetermined time period by the access network are merely two possible implementations, and shall not constitute any limitation on this application. For example, the two manners may alternatively be used in combination. For example, the start time point of the predetermined time period may be indicated by the access network device, and the time period length may be defined in the protocol.

To reduce overheads and processing load of the access network device, the terminal device may further report the information about the jitter level based on a reporting condition and/or a reporting periodicity.

The reporting condition and the reporting periodicity may be predefined, for example, defined in a protocol, or may be indicated by the access network device to the terminal device in advance.

Optionally, the method 300 further includes step 350: The terminal device receives second indication information of the reporting condition.

Correspondingly, in step 350, the access network device sends the second indication information of the reporting condition.

In this embodiment of this application, the reporting condition of the information about the jitter level may be the same as or different from the reporting condition of the buffer latency information in the foregoing method 200. For example, the reporting condition may be that the jitter level reaches a preset threshold. For another example, the reporting condition may be that the buffer latency information of one or more data packets reaches a preset threshold. It should be understood that the reporting condition listed herein is merely an example, and shall not constitute any limitation on this application. Specific content of the reporting condition of the information about the jitter level is not limited in this application.

Optionally, the method 300 further includes step 360: The terminal device receives second indication information of the reporting periodicity.

Correspondingly, in step 360, the access network device sends the second indication information of the reporting periodicity.

In this embodiment of this application, the reporting periodicity of the information about the jitter level may be the same as or different from the reporting periodicity of the buffer latency information in the foregoing method 200. This is not limited in this application.

It should be understood that the reporting condition and the reporting periodicity are described in detail in the foregoing method 200, and specific processes of step 350 and step 360 are similar to step 250 and step 260 in the foregoing method 200. Because the reporting condition, the reporting periodicity, step 250, and step 260 are described in detail above, for brevity, details are not described herein again.

In step 370, the terminal device sends the information about the jitter level.

Correspondingly, in step 370, the access network device receives the information about the jitter level.

After determining the information about the jitter level, the terminal device may report the information about the jitter level to the access network device.

It should be understood that a specific process of step 370 is similar to that of the foregoing step 240. Because step 240 is described in detail above, for brevity, details are not described herein again.

Therefore, the terminal device reports the jitter level to the access network device, so that the access network device may control buffer latencies of a plurality of adjacent data packets, to reduce the latencies to a same level, so as to reduce a jitter and improve user experience.

Optionally, the method 300 further includes step 380: The terminal device sends second reporting capability information, where the second reporting capability information indicates that the terminal device has a capability of reporting the jitter level.

Correspondingly, in step 380, the access network device receives the second reporting capability information, where the second reporting capability information indicates that the terminal device has the capability of reporting the jitter level.

Optionally, the method 300 further includes step 390: The terminal device receives second statistics collection capability information, where the second statistics collection capability information indicates that the access network device has a capability of collecting statistics about the jitter level.

Correspondingly, in step 390, the access network device sends the second statistics collection capability information, where the second statistics collection capability information indicates that the access network device has the capability of collecting statistics about the jitter level.

It should be understood that specific processes of step 380 and step 390 are similar to specific processes of step 270 and step 280 in the foregoing method 200. Because detailed descriptions are provided above with reference to step 270 and step 280, for brevity, details are not described herein again.

Optionally, step 370 specifically includes: The terminal device sends a second MAC CE, where the second MAC CE carries the information about the jitter level.

Correspondingly, the access network device receives the second MAC CE, where the second MAC CE carries the information about the jitter level.

After determining the jitter level at a MAC layer, the first communications apparatus may generate the second MAC CE at the MAC layer, and add the information about the jitter level to the second MAC CE, to report the second MAC CE to the access network device. The second MAC CE may be a newly added MAC CE, or may be an extension to an existing MAC CE. This is not limited in this application.

In a possible design, the second MAC CE includes a fourth field and a fifth field corresponding to the fourth field. The fourth field is used to indicate an identifier of a measurement object, and the fifth field is used to indicate a jitter level of the measurement object.

Optionally, the second MAC CE includes M fourth fields and M fifth fields, the M fourth fields are in a one-to-one correspondence with the M fifth fields, and M is an integer greater than or equal to 1.

An $m^{th}$ fourth field may be used to indicate an identifier of a measurement object, and an $m^{th}$ fifth field may be used to indicate a jitter level of the measurement object indicated by the $m^{th}$ fourth field, where 1≤m≤M, and m is an integer.

Specifically, the $m^{th}$ fourth field may be used to indicate an identifier of a logical channel, and the $m^{th}$ fifth field may be used to indicate a jitter level determined based on buffer latencies of a plurality of data packets carried on the logical channel indicated by the $m^{th}$ first field;

the $m^{th}$ fourth field may be used to indicate an identifier of a logical channel group, and the $m^{th}$ fifth field may be used to indicate a jitter level determined based on buffer latencies of a plurality of data packets carried on the logical channel group indicated by the $m^{th}$ fourth field;

the $m^{th}$ fourth field may be used to indicate an identifier of a network slice, and the $m^{th}$ fifth field may be used to indicate a jitter level determined based on buffer latencies of a plurality of data packets carried on the network slice indicated by the $m^{th}$ fourth field; or the $m^{th}$ fourth field may be used to indicate an identifier of a radio bearer, and the $m^{th}$ fifth field may be used to indicate a jitter level determined based on buffer latencies of a plurality of data packets carried on the radio bearer indicated by the $m^{th}$ fourth field.

Figure 16:
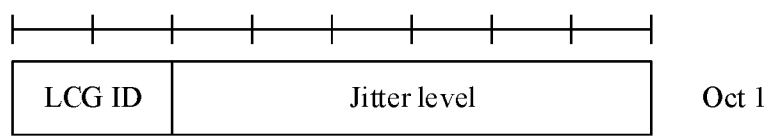
FIG. 16 and FIG. 17 each are a schematic diagram of a MAC CE according to another embodiment of this application.

FIG. 16 is a schematic diagram of a second MAC CE according to another embodiment of this application. The second MAC CE in FIG. 16 carries one piece of information about a jitter level, and a reporting granularity of the information about the jitter level is a logical channel group. A measurement object of the jitter level carried in the second MAC CE is a logical channel group, the fourth field is used to indicate an identifier of the measured logical channel group, and the fifth field is used to indicate the jitter level of the logical channel group.

It should be understood that a format of the second MAC CE may be similar to the formats of the first MAC CE listed with reference to FIG. 6 to FIG. 16 in the foregoing method 200. For brevity, examples are not described herein again with reference to the accompanying drawings.

Figure 17:
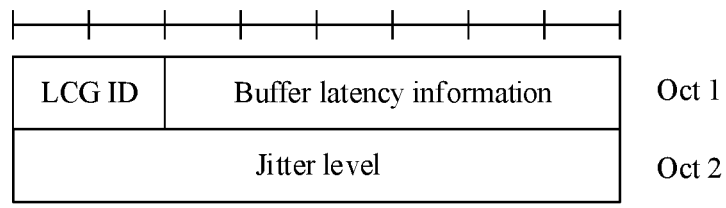

It should be further understood that the second MAC CE and the first MAC CE in the foregoing method 200 may be combined into one MAC CE, for example, the MAC CE shown in FIG. 17. In this case, the fourth field in the second MAC CE is the same as the first field in the first MAC CE in the foregoing method 200. In addition, the MAC CE may further include the second field used to indicate the buffer latency information and the fifth field used to indicate the jitter level. It should be understood that the figure shows only an example of a possible design, but this shall not constitute any limitation on this application. A format of the MAC CE is not particularly limited in this application.

Optionally, step 320 specifically includes: The terminal device sends a second RRC message, where the second RRC message carries the information about the jitter level.

Correspondingly, the access network device receives the second RRC message, where the second RRC message carries the information about the jitter level.

After the MAC layer determines the jitter level, the first communications apparatus may notify the RRC layer of the jitter level by using an inter-layer primitive, and the RRC layer generates the second RRC message carrying the information about the jitter level. It should be understood that the RRC message may be a newly added RRC message, or may be an extension to an existing RRC message. This is not limited in this application.

Based on the foregoing technical solutions, the terminal device may determine the jitter level based on the buffer latencies of the plurality of data packets, and report the information about the jitter level to the access network device, so that the access network device controls adjacent data packets, to control buffer latency values of a plurality of data packets with consecutive sequence numbers to approximate one latency value. In this way, a difference between the latencies of the plurality of data packets with consecutive sequence numbers can be reduced. This helps reduce a jitter, provide stable data transmission, and improve user experience.

It should be understood that the first indication information in the foregoing method 200 and the second indication information in the method 300 may be same indication information, or may be different indication information. This is not limited in this application. For example, the first indication information of the reporting granularity and the second indication information of the reporting granularity may be same indication information, and the terminal device may report the buffer latency information and the jitter level based on the same reporting granularity. Alternatively, the first indication information of the reporting granularity and the second indication information of the reporting granularity may be different indication information, the terminal device may report the buffer latency information and the jitter level based on different reporting granularities.

The communication methods in the embodiments of this application are described above in detail with reference to FIG. 2 to FIG. 17. Communications apparatuses in the embodiments of this application are described below in detail with reference to FIG. 18 to FIG. 21.

Figure 18:
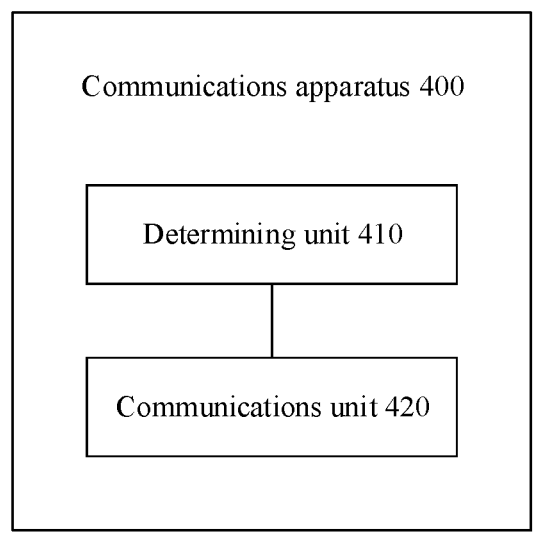
FIG. 18 is a schematic block diagram of a communications apparatus according to an embodiment of this application.

FIG. 18 is a schematic block diagram of a communications apparatus 400 according to an embodiment of this application. As shown in the figure, the apparatus 400 includes a determining unit 410 and a communications unit 420.

In a possible design, the determining unit 410 is configured to determine buffer latency information, where the buffer latency information is determined based on a buffer latency of one or more data packets, and the buffer latency indicates a time interval between a time point at which a data packet arrives at an access stratum AS and a time point at which a corresponding buffer status report BSR is sent, or the buffer latency indicates a time interval between a time point at which a data packet arrives at an AS and a time point at which a corresponding uplink grant is received; and the communications unit 420 is configured to send the buffer latency information by the first communications apparatus.

Optionally, the buffer latency information is used to indicate:

a buffer latency of each of the one or more data packets; or an average value, a maximum value, a minimum value, or an accumulated value of buffer latencies of a plurality of data packets.

Optionally, the determining unit 410 is specifically configured to determine the buffer latency information based on a data packet type.

The data packet type includes: an SDAP SDU, an SDAP PDU, a PDCP PDU, an RLC PDU, or a MAC PDU.

Optionally, the communications unit 420 is further configured to receive indication information used to indicate the data packet type.

Optionally, the determining unit 410 is specifically configured to determine the buffer latency information based on a reporting granularity.

The reporting granularity includes a data packet, a logical channel, a logical channel group, a network slice, or a radio bearer.

Optionally, the communications unit 420 is further configured to send an identifier corresponding to the reporting granularity.

Optionally, the communications unit 420 is further configured to receive indication information used to indicate the reporting granularity.

Optionally, the communications unit 420 is further configured to receive indication information used to indicate a reporting condition.

Optionally, the communications unit 420 is further configured to receive indication information used to indicate a reporting periodicity.

Optionally, the communications unit 420 is further configured to send first reporting capability information, where the first reporting capability information is used to indicate that the communications apparatus 400 has a capability of reporting the buffer latency information.

Optionally, the communications unit 420 is further configured to receive first statistics collection capability information, where the first statistics collection capability information is used to indicate that a second communications apparatus has a capability of collecting statistics about the buffer latency information.

Optionally, the communications unit 420 is further configured to send a MAC CE, where the MAC CE carries the buffer latency information.

Optionally, the MAC CE includes a first field and a second field corresponding to the first field; and the first field indicates an identifier of a logical channel, and the second field indicates buffer latency information of one or more data packets carried on the logical channel;

the first field indicates an identifier of a logical channel group, and the second field indicates buffer latency information of one or more data packets carried on one or more logical channels in the logical channel group;

the first field indicates an identifier of a network slice, and the second field indicates buffer latency information of one or more data packets transmitted on the network slice; or the first field indicates an identifier of a radio bearer, and the second field indicates buffer latency information of one or more data packets carried on the radio bearer. Optionally, the MAC CE includes a first field, a second field corresponding to the first field, and a third field corresponding to the first field; and the first field indicates an identifier of a logical channel, the second field indicates buffer latency information of one or more data packets carried on the logical channel, and the third field indicates a size of the data packets carried on the logical channel;

the first field indicates an identifier of a logical channel group, the second field indicates buffer latency information of one or more data packets carried on one or more logical channels in the logical channel group, and the third field indicates a size of the data packets carried on the logical channels in the logical channel group;

the first field indicates an identifier of a network slice, the second field indicates buffer latency information of one or more data packets transmitted on the network slice, and the third field indicates a size of the data packets transmitted on the network slice; or the first field indicates an identifier of a radio bearer, the second field indicates buffer latency information of one or more data packets carried on the radio bearer, and the third field indicates a size of the data packets carried on the radio bearer. Optionally, the MAC CE is a BSR MAC CE.

Optionally, the communications unit 420 is further configured to send an RRC message, where the RRC message carries the buffer latency information.

Specifically, the communications apparatus 400 may correspond to the terminal device in the communication method 200 in the embodiments of this application, or a chip disposed in the terminal device. The communications apparatus 400 may include units configured to perform the method performed by the terminal device in the communication method 200 in FIG. 5. In addition, the units in the communications apparatus 400 and the foregoing other operations and/or functions are separately intended to implement corresponding procedures of the communication method 200 in FIG. 5. A specific process of performing the foregoing corresponding steps by the units is described in detail in the method 200. For brevity, details are not described herein again.

In another possible design, the determining unit 410 is configured to determine a jitter level based on buffer latencies of a plurality of data packets, where the buffer latency indicates a time interval between a time point at which a data packet arrives at an access stratum AS and a time point at which a corresponding buffer status report BSR is sent, or the buffer latency indicates a time interval between a time point at which a data packet arrives at an AS and a time point at which a corresponding uplink grant is received; and the communications unit 420 is configured to send information about the jitter level.

Optionally, the determining unit 410 is specifically configured to determine the jitter level based on a data packet type and buffer latencies of a plurality of data packets corresponding to the data packet type.

The data packet type includes: an SDAP SDU, an SDAP PDU, a PDCP PDU, an RLC PDU, or a MAC PDU.

Optionally, the communications unit 420 is further configured to receive indication information used to indicate the data packet type.

Optionally, the determining unit 410 is specifically configured to determine the jitter level based on a reporting granularity, where the jitter level is determined based on buffer latencies of a plurality of data packets corresponding to the reporting granularity in a buffer time period.

The reporting granularity includes a logical channel, a logical channel group, a network slice, or a radio bearer.

Optionally, the communications unit 420 is further configured to receive indication information used to indicate the reporting granularity.

Optionally, the communications unit 420 is further configured to receive indication information of a predetermined time period.

Optionally, the communications unit 420 is specifically configured to send the information about the jitter level when a reporting condition is met.

Optionally, the communications unit 420 is further configured to receive indication information used to indicate the reporting condition.

Optionally, the communications unit 420 is specifically configured to send the information about the jitter level based on a reporting periodicity.

Optionally, the communications unit 420 is further configured to receive indication information used to indicate the reporting periodicity.

Optionally, the communications unit 420 is further configured to send second reporting capability information, where the second reporting capability information is used to indicate that the communications apparatus 400 has a capability of reporting the information about the jitter level.

Optionally, the communications unit 420 is further configured to receive second statistics collection capability information, where the second statistics collection capability information is used to indicate that a second communications apparatus has a capability of collecting statistics about the information about the jitter level.

Optionally, the communications unit 420 is further configured to send a MAC CE, where the MAC CE carries the information about the jitter level.

The MAC CE includes a fourth field and a fifth field corresponding to the fourth field; and the fourth field indicates an identifier of a logical channel, and the fifth field indicates a jitter level determined based on buffer latencies of a plurality of data packets carried on the logical channel;

the fourth field indicates an identifier of a logical channel group, and the fifth field indicates a jitter level determined based on buffer latencies of a plurality of data packets carried on the logical channel group;

the fourth field indicates an identifier of a network slice, and the fifth field indicates a jitter level determined based on buffer latencies of a plurality of data packets carried on the network slice; or the fourth field indicates an identifier of a radio bearer, and the fifth field indicates a jitter level determined based on buffer latencies of a plurality of data packets carried on the radio bearer.

Optionally, the communications unit 420 is further configured to send an RRC message, where the RRC message carries the information about the jitter level.

Specifically, the communications apparatus 400 may correspond to the terminal device in the communication method 300 in the embodiments of this application, or a chip disposed in the terminal device. The communications apparatus 400 may include units configured to perform the method performed by the terminal device in the communication method 300 in FIG. 15. In addition, the units in the communications apparatus 400 and the foregoing other operations and/or functions are separately intended to implement corresponding procedures of the communication method 300 in FIG. 15. A specific process of performing the foregoing corresponding steps by the units is described in detail in the method 300. For brevity, details are not described herein again.

Figure 19:
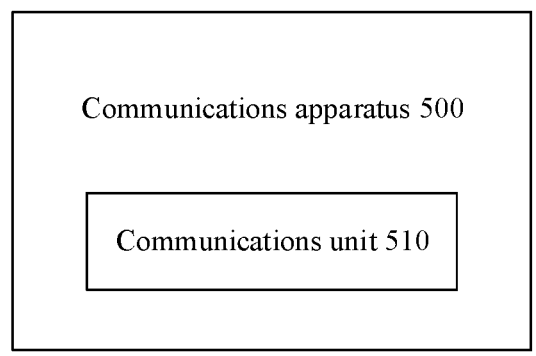
FIG. 19 is a schematic block diagram of a communications apparatus according to another embodiment of this application.

FIG. 19 is a schematic block diagram of a communications apparatus 500 according to another embodiment of this application. As shown in the figure, the communications apparatus 500 includes a communications unit 510.

In a possible design, the communications unit 510 is configured to receive buffer latency information, where the buffer latency information is determined based on a buffer latency of one or more data packets, and the buffer latency indicates a time interval between a time point at which a data packet arrives at an access stratum AS and a time point at which a corresponding buffer status report BSR is sent, or the buffer latency indicates a time interval between a time point at which a data packet arrives at an AS and a time point at which a corresponding uplink grant is received.

Optionally, the buffer latency information is used to indicate:

a buffer latency of each of the one or more data packets; or an average value, a maximum value, a minimum value, or an accumulated value of buffer latencies of a plurality of data packets.

Optionally, the communications unit 510 is further configured to send indication information used to indicate a data packet type.

The data packet type includes: an SDAP SDU, an SDAP PDU, a PDCP PDU, an RLC PDU, or a MAC PDU.

Optionally, the communications unit 510 is further configured to send indication information used to indicate a reporting granularity.

The reporting granularity includes a data packet, a logical channel, a logical channel group, a network slice, or a radio bearer.

Optionally, the communications unit 510 is further configured to receive an identifier corresponding to the reporting granularity.

Optionally, the communications unit 510 is further configured to send indication information used to indicate a reporting condition.

Optionally, the communications unit 510 is further configured to send indication information used to indicate a reporting periodicity.

Optionally, the communications unit 510 is further configured to receive first reporting capability information, where the first reporting capability information is used to indicate that a first communications apparatus has a capability of reporting the buffer latency information.

Optionally, the communications unit 510 is further configured to send first statistics collection capability information, where the first statistics collection capability information is used to indicate that the communications apparatus 500 has a capability of collecting statistics about the buffer latency information.

Optionally, the communications unit 510 is specifically configured to receive a MAC CE, where the MAC CE carries the buffer latency information.

Optionally, the MAC CE includes a first field and a second field corresponding to the first field; and the first field indicates an identifier of a logical channel, and the second field indicates buffer latency information of one or more data packets carried on the logical channel;

the first field indicates an identifier of a logical channel group, and the second field indicates buffer latency information of one or more data packets carried on one or more logical channels in the logical channel group;

the first field indicates an identifier of a network slice, and the second field indicates buffer latency information of one or more data packets transmitted on the network slice; or the first field indicates an identifier of a radio bearer, and the second field indicates buffer latency information of one or more data packets carried on the radio bearer Optionally, the MAC CE includes a first field, a second field corresponding to the first field, and a third field corresponding to the first field; and the first field indicates an identifier of a logical channel, the second field indicates buffer latency information of one or more data packets carried on the logical channel, and the third field indicates a size of the data packets carried on the logical channel;

the first field indicates an identifier of a logical channel group, the second field indicates buffer latency information of one or more data packets carried on one or more logical channels in the logical channel group, and the third field indicates a size of the data packets carried on the logical channels in the logical channel group;

the first field indicates an identifier of a network slice, the second field indicates buffer latency information of one or more data packets transmitted on the network slice, and the third field indicates a size of the data packets transmitted on the network slice; or the first field indicates an identifier of a radio bearer, the second field indicates buffer latency information of one or more data packets carried on the radio bearer, and the third field indicates a size of the data packets carried on the radio bearer Optionally, the communications unit 510 is specifically configured to receive an RRC message, where the RRC message carries the buffer latency information.

Specifically, the communications apparatus 500 may correspond to the access network device in the communication method 200 in the embodiments of this application, or a chip disposed in the access network device. The communications apparatus 500 may include units configured to perform the method performed by the access network device in the communication method 200 in FIG. 5. In addition, the units in the communications apparatus 500 and the foregoing other operations and/or functions are separately intended to implement corresponding procedures of the communication method 200 in FIG. 5. A specific process of performing the foregoing corresponding steps by the units is described in detail in the method 200. For brevity, details are not described herein again.

In another possible design, the communications unit 510 is configured to receive information about a jitter level, where the information about the jitter level is determined based on a buffer latency of one or more data packets, and the buffer latency indicates a time interval between a time point at which a data packet arrives at an access stratum AS and a time point at which a corresponding buffer status report BSR is sent, or the buffer latency indicates a time interval between a time point at which a data packet arrives at an AS and a time point at which a corresponding uplink grant is received.

Optionally, the buffer latency information is used to indicate:

a buffer latency of each of the one or more data packets; or an average value, a maximum value, a minimum value, or an accumulated value of buffer latencies of a plurality of data packets.

Optionally, the communications unit 510 is further configured to send indication information used to indicate a data packet type.

The data packet type includes: an SDAP SDU, an SDAP PDU, a PDCP PDU, an RLC PDU, or a MAC PDU.

Optionally, the communications unit 510 is further configured to send indication information used to indicate a reporting granularity.

The reporting granularity includes a data packet, a logical channel, a logical channel group, a network slice, or a radio bearer.

Optionally, the communications unit 510 is further configured to send indication information used to indicate a predetermined time period.

Optionally, the communications unit 510 is further configured to receive an identifier corresponding to the reporting granularity.

Optionally, the communications unit 510 is further configured to send indication information used to indicate a reporting condition.

Optionally, the communications unit 510 is further configured to send indication information used to indicate a reporting periodicity.

Optionally, the communications unit 510 is further configured to receive second reporting capability information, where the second reporting capability information is used to indicate that a first communications apparatus has a capability of reporting the information about the jitter level.

Optionally, the communications unit 510 is further configured to send second statistics collection capability information, where the second statistics collection capability information is used to indicate that the communications apparatus 500 has a capability of collecting statistics about the information about the jitter level.

Optionally, the communications unit 510 is specifically configured to receive a MAC CE, where the MAC CE carries the information about the jitter level.

Optionally, the MAC CE includes a fourth field and a fifth field corresponding to the fourth field; and the fourth field indicates an identifier of a logical channel, and the fifth field indicates a jitter level determined based on buffer latencies of a plurality of data packets carried on the logical channel;

the fourth field indicates an identifier of a logical channel group, and the fifth field indicates a jitter level determined based on buffer latencies of a plurality of data packets carried on the logical channel group;

the fourth field indicates an identifier of a network slice, and the fifth field indicates a jitter level determined based on buffer latencies of a plurality of data packets carried on the network slice; or the fourth field indicates an identifier of a radio bearer, and the fifth field indicates a jitter level determined based on buffer latencies of a plurality of data packets carried on the radio bearer.

Optionally, the communications unit 510 is specifically configured to receive an RRC message, where the RRC message carries the information about the jitter level.

Specifically, the communications apparatus 500 may correspond to the access network device in the communication method 300 in the embodiments of this application, or a chip disposed in the access network device. The communications apparatus 500 may include units configured to perform the method performed by the access network device in the communication method 300 in FIG. 15. In addition, the units in the communications apparatus 500 and the foregoing other operations and/or functions are separately intended to implement corresponding procedures of the communication method 300 in FIG. 15. A specific process of performing the foregoing corresponding steps by the units is described in detail in the method 300. For brevity, details are not described herein again.

Figure 20:
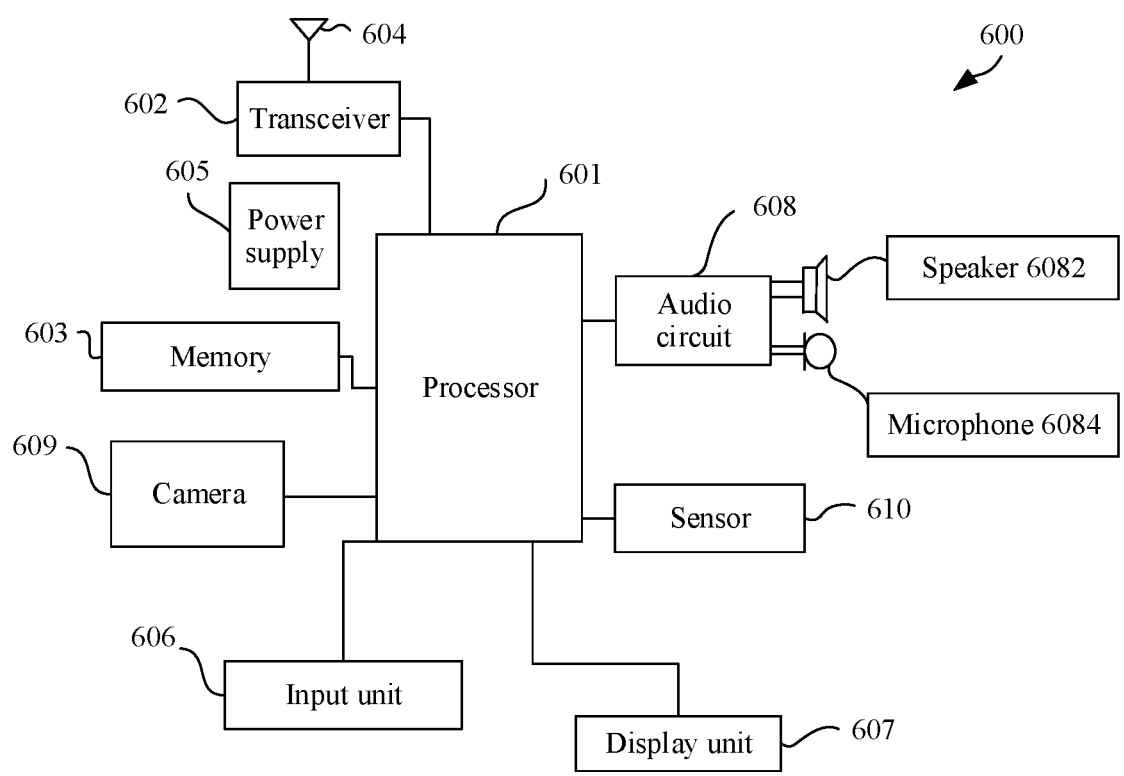
FIG. 20 is a schematic structural diagram of a terminal device according to an embodiment of this application.

FIG. 20 is a schematic structural diagram of a terminal device 600 according to an embodiment of this application. As shown in the figure, the terminal device 600 includes a processor 601 and a transceiver 602. Optionally, the terminal device 600 further includes a memory 603. The processor 601, the transceiver 602, and the memory 603 may communicate with each other, by using an internal connection path, to transfer a control signal and/or a data signal. The memory 603 is configured to store a computer program. The processor 601 is configured to: invoke the computer program from the memory 603, and run the computer program, to control the transceiver 602 to send and receive a signal. Optionally, the terminal device 600 may further include an antenna 604, configured to send, by using a radio signal, uplink data or uplink control signaling that is output by the transceiver 602.

The processor 601 and the memory 603 may be integrated into one processing apparatus. The processor 601 is configured to execute program code stored in the memory 603 to implement the foregoing functions. During specific implementation, the memory 603 may alternatively be integrated into the processor 601, or may be independent of the processor 601.

In a possible design, when a program instruction stored in the memory 603 is executed by the processor 601, the processor 601 is configured to: determine buffer latency information, and control the transceiver 602 to send the buffer latency information.

Specifically, the terminal device 600 may correspond to the terminal device in the communication method 200 in the embodiments of this application. The terminal device 600 may include units configured to perform the method performed by the terminal device in the communication method 200 in FIG. 5. In addition, the units in the terminal device 600 and the foregoing other operations and/or functions are separately intended to implement corresponding procedures of the communication method 200 in FIG. 5. A specific process of performing the foregoing corresponding steps by the units has been described in detail in the method 200. For brevity, details are not described herein again.

In another possible design, when a program instruction stored in the memory 603 is executed by the processor 601, the processor 601 is configured to: determine information about a jitter level, and control the transceiver 602 to send the information about the jitter level.

Specifically, the terminal device 600 may correspond to the terminal device in the communication method 300 in the embodiments of this application, or a chip disposed in the terminal device. The terminal device 600 may include units configured to perform the method performed by the terminal device in the communication method 300 in FIG. 15. In addition, the units in the terminal device 600 and the foregoing other operations and/or functions are separately intended to implement corresponding procedures of the communication method 300 in FIG. 15. A specific process of performing the foregoing corresponding steps by the units is described in detail in the method 300. For brevity, details are not described herein again.

The processor 601 may be configured to perform an action that is implemented inside the terminal device and that is described in the foregoing method embodiments, and the transceiver 602 may be configured to perform an action of sending to the access network device or receiving from the access network device that is performed by the terminal device and that is described in the foregoing method embodiments. For details, refer to the descriptions in the foregoing method embodiments. Details are not described herein again.

Optionally, the terminal device 600 may further include a power supply 605, configured to supply power to various components in the terminal device.

In addition, to make functions of the terminal device more perfect, the terminal device 600 may further include one or more of an input unit 606, a display unit 607, an audio circuit 608, a camera 609, a sensor 610, and the like, and the audio circuit may further include a speaker 6082, a microphone 6084, and the like.

In some possible implementations, the determining unit 410 in FIG. 18 may correspond to the processor 601 in FIG. 20, and the communications unit 420 in FIG. 18 may correspond to the transceiver 602 in FIG. 20.

Figure 21:
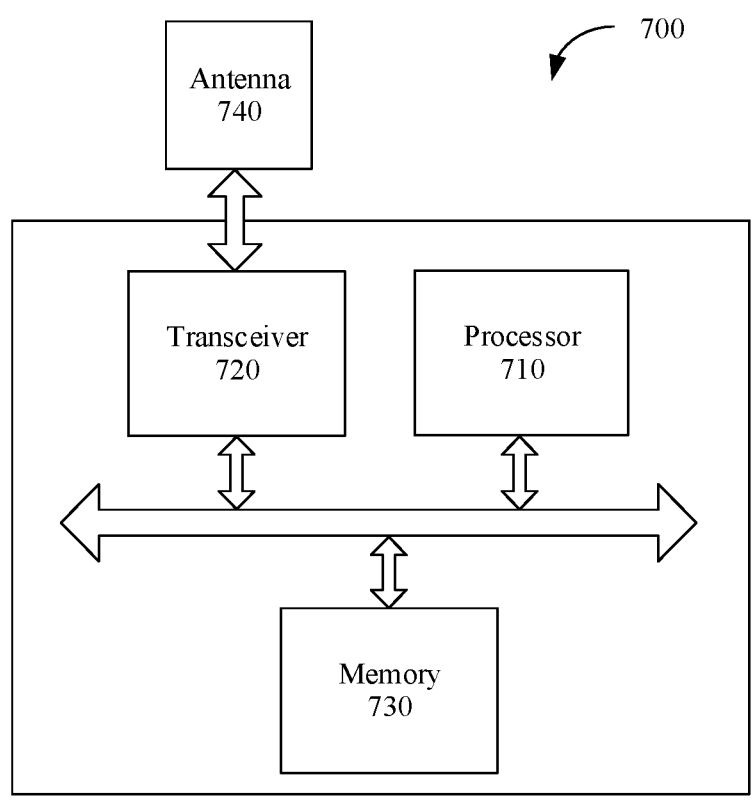
FIG. 21 is a schematic structural diagram of an access network device according to an embodiment of this application.

FIG. 21 is a schematic structural diagram of an access network device 700 according to an embodiment of this application. As shown in the figure, the access network device 700 includes a processor 710 and a transceiver 720. Optionally, the access network device 700 further includes a memory 730. The processor 710, the transceiver 720, and the memory 730 communicate with each other by using an internal connection path, and transfer a control signal and/or a data signal. The memory 730 is configured to store a computer program. The processor 710 is configured to: invoke the computer program from the memory 730, and run the computer program, to control the transceiver 720 to send and receive a signal.

The processor 710 and the memory 730 may be integrated into one processing apparatus. The processor 710 is configured to execute program code stored in the memory 730 to implement the foregoing functions. During specific implementation, the memory 730 may alternatively be integrated into the processor 710, or may be independent of the processor 710.

The access network device 700 may further include an antenna 740, configured to send, by using a radio signal, downlink data or downlink control signaling output by the transceiver 720.

In a possible design, when a program instruction stored in the memory 730 is executed by the processor 710, the processor 710 is configured to control the transceiver 720 to receive buffer latency information.

Specifically, the access network device 700 may correspond to the access network device in the communication method 200 in the embodiments of this application. The access network device 700 may include units configured to perform the method performed by the access network device in the communication method 200 in FIG. 5. In addition, the units in the access network device 700 and the foregoing other operations and/or functions are separately intended to implement corresponding procedures of the communication method 200 in FIG. 5. A specific process of performing the foregoing corresponding steps by the units has been described in detail in the method 200. For brevity, details are not described herein again.

In another possible design, when a program instruction stored in the memory 730 is executed by the processor 710, the processor 710 is configured to control the transceiver 720 to receive information about a jitter level.

Specifically, the access network device 700 may correspond to the access network device in the communication method 300 in the embodiments of this application. The access network device 700 may include units configured to perform the method performed by the access network device in the communication method 300 in FIG. 15. In addition, the units in the access network device 700 and the foregoing other operations and/or functions are separately intended to implement corresponding procedures of the communication method 300 in FIG. 15. A specific process of performing the foregoing corresponding steps by the units has been described in detail in the method 300. For brevity, details are not described herein again.

The processor 710 may be configured to perform an action that is implemented inside the access network device and that is described in the foregoing method embodiments, and the transceiver 720 may be configured to perform an action of sending to the terminal device or receiving from the terminal device that is performed by the access network device and that is described in the foregoing method embodiments. For details, refer to the descriptions in the foregoing method embodiments. Details are not described herein again.

In some possible implementations, the communications unit 510 in FIG. 19 may correspond to the transceiver 720 in FIG. 21.

It should be understood that, the processor in the embodiments of this application may be a central processing unit (central processing unit, CPU), or the processor may be another general-purpose processor, a digital signal processor (digital signal processor, DSP), an application-specific integrated circuit (application specific integrated circuit, ASIC), a field programmable gate array (field programmable gate array, FPGA) or another programmable logic device, a discrete gate or a transistor logic device, a discrete hardware component, or the like.

It may be further understood that the memory in the embodiments of this application may be a volatile memory or a non-volatile memory, or may include a volatile memory and a non-volatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. Through example but not limitative description, many forms of random access memories (random access memory, RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM).

According to the methods provided in the embodiments of this application, this application further provides a computer program product. The computer program product includes computer program code. When the computer program code is run on a computer, the computer is enabled to perform the method in the embodiment shown in FIG. 2 or FIG. 15.

According to the methods provided in the embodiments of this application, this application further provides a computer-readable medium. The computer-readable medium stores program code. When the program code is run on a computer, the computer is enabled to perform the method in the embodiment shown in FIG. 2 or FIG. 15.

According to the methods provided in the embodiments of this application, this application further provides a system, including the foregoing one or more terminal devices and the foregoing one or more access network devices.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on a particular application and a design constraint of technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   determining, by a first communications apparatus, buffer latency information,
      wherein the buffer latency information is determined based on a buffer latency of one or more data packets, and
      wherein the buffer latency indicates
         a time interval between a start time point at which a data packet arrives at an access stratum (AS) and an end time point at which at least one of a corresponding buffer status report (BSR) or a resource scheduling request is sent; and
   sending, by the first communications apparatus, the buffer latency information.

2. The method according to claim 1, wherein the buffer latency information indicates:
   a buffer latency of each of the one or more data packets; or
   at least one of an average value, a maximum value, a minimum value, or an accumulated value of buffer latencies of a plurality of data packets.

3. The method according to claim 1, wherein the determining, by a first communications apparatus, buffer latency information comprises:
   determining, by the first communications apparatus, the buffer latency information based on a data packet type,
   wherein the data packet type comprises one of:
      a service data adaptation protocol (SDAP),
      a service data unit (SDU),
      an SDAP protocol data unit (PDU),
      a packet data convergence protocol (PDCP) PDU,
      a radio link control (RLC) PDU, or
      a media access control (MAC) PDU.

4. The method according to claim 3, wherein the method further comprises:
   receiving, by the first communications apparatus, indication information that indicates the data packet type.

5. The method according to claim 1, wherein the determining, by a first communications apparatus, buffer latency information comprises:
   determining, by the first communications apparatus, the buffer latency information based on a reporting granularity,
   wherein the reporting granularity comprises at least one of a data packet, a logical channel, a logical channel group, a network slice, or a radio bearer.

6. The method according to claim 1, wherein the method further comprises:
   determining, by the first communications apparatus, a jitter level based on the buffer latency; and
   sending, by the first communications apparatus and to an access network device, information about the jitter level.

7. The method according to claim 6, wherein the determining a jitter level based on the buffer latency comprises at least one of:
   determining the jitter level based on a data packet type and buffer latencies of a plurality of data packets corresponding to the data packet type; or
   determining the jitter level based on a reporting granularity and buffer latencies of a plurality of data packets corresponding to the reporting granularity.

8. A communications apparatus, comprising:
   at least one processor;
   one or more memories coupled to the at least one processor and storing programming instructions for execution by the at least one processor, the programming instructions instructing the at least one processor to:
      determine buffer latency information, wherein the buffer latency information is determined based on a buffer latency of one or more data packets, and the buffer latency indicates
         a time interval between a start time point at which a data packet arrives at an access stratum (AS) and an end time point at which at least one of a corresponding buffer status report (BSR) or a resource scheduling request is sent; and
      send the buffer latency information.

9. The apparatus according to claim 8, wherein the buffer latency information indicates:
   a buffer latency of each of the one or more data packets; or
   one of an average value, a maximum value, a minimum value, or an accumulated value of buffer latencies of a plurality of data packets.

10. The apparatus according to claim 8, wherein the programming instructions instruct the at least one processor to:
    determine the buffer latency information based on a data packet type,
    wherein the data packet type comprises one of:
       a service data adaptation protocol (SDAP),
       a service data unit (SDU),
       an SDAP protocol data unit (PDU),
       a packet data convergence protocol (PDCP) PDU,
       a radio link control (RLC) PDU, or
       a media access control (MAC) PDU.

11. The apparatus according to claim 10, wherein the programming instructions instruct the at least one processor to:
    receive indication information that indicates the data packet type.

12. The apparatus according to claim 8, wherein the programming instructions instruct the at least one processor to:
    determine the buffer latency information based on a reporting granularity,
    wherein the reporting granularity comprises one of a data packet, a logical channel, a logical channel group, a network slice, or a radio bearer.

13. A communication method, comprising:
    receiving, from a first communications apparatus and by a second communications apparatus, buffer latency information,
    wherein the buffer latency information is determined based on a buffer latency of one or more data packets in the first communications apparatus, and the buffer latency indicates
       a time interval between a start time point at which a data packet arrives at an access stratum (AS) and an end time point at which at least one of a corresponding buffer status report (BSR) or a resource scheduling request is sent.

14. The method according to claim 13, wherein the buffer latency information indicates:
    a buffer latency of each of the one or more data packets; or one of an average value, a maximum value, a minimum value, or an accumulated value of buffer latencies of a plurality of data packets.

15. The method according to claim 13, wherein the method further comprises:
sending, by the second communications apparatus, indication information that indicates a data packet type,
wherein the data packet type comprises one of:
a service data adaptation protocol (SDAP),
a service data unit (SDU),
an SDAP protocol data unit (PDU),
a packet data convergence protocol (PDCP) PDU,
a radio link control (RLC) PDU, or
a media access control (MAC) PDU.

16. The method according to claim 13, wherein the method further comprises:
sending, by the second communications apparatus, indication information that indicates a reporting granularity,
wherein the reporting granularity comprises one of a data packet, a logical channel, a logical channel group, a network slice, or a radio bearer.

17. The method according to claim 16, wherein the method further comprises:
receiving, by the second communications apparatus, an identifier corresponding to the reporting granularity.

18. A communication apparatus, comprising:
at least one processor;
one or more memories coupled to the at least one processor and storing programming instructions for execution by the at least one processor, the programming instructions instructing the at least one processor to:
receive buffer latency information,
wherein the buffer latency information is determined based on a buffer latency of one or more data packets in a first communications apparatus, and the buffer latency indicates
a time interval between a start time point at which a data packet arrives at an access stratum (AS) and an end time point at which at least one of a corresponding buffer status report (BSR) or a resource scheduling request is sent.

19. The apparatus according to claim 18, wherein the buffer latency information indicates:
a buffer latency of each of the one or more data packets; or
one of an average value, a maximum value, a minimum value, or an accumulated value of buffer latencies of a plurality of data packets.

20. The apparatus according to claim 18, wherein the programming instructions instruct the at least one processor to:
send indication information that indicates a data packet type,
wherein the data packet type comprises one of:
a service data adaptation protocol (SDAP),
a service data unit (SDU),
an SDAP protocol data unit (PDU),
a packet data convergence protocol (PDCP) PDU,
a radio link control (RLC) PDU, or
a media access control (MAC) PDU.

21. The apparatus according to claim 18, wherein the programming instructions instruct the at least one processor to:
send indication information that indicates a reporting granularity,
wherein the reporting granularity comprises one of a data packet, a logical channel, a logical channel group, a network slice, or a radio bearer.

22. The apparatus according to claim 21, wherein the programming instructions instruct the at least one processor to:
receive an identifier corresponding to the reporting granularity.

* * * * *